United States Patent
Fromme et al.

(10) Patent No.: US 7,742,892 B2
(45) Date of Patent: Jun. 22, 2010

(54) CALIBRATING AN OPTICAL FMCW BACKSCATTERING MEASUREMENT SYSTEM

(75) Inventors: Martin Fromme, Cologne (DE); Ulrich Glombitza, Bergisch Gladbach (DE)

(73) Assignee: Lios Technology GmbH, Cologne (DE)

( * ) Notice: Subject to any disclaimer, the term of this patent is extended or adjusted under 35 U.S.C. 154(b) by 619 days.

(21) Appl. No.: 11/574,575

(22) PCT Filed: Sep. 7, 2005

(86) PCT No.: PCT/EP2005/054418

§ 371 (c)(1),
(2), (4) Date: Mar. 1, 2007

(87) PCT Pub. No.: WO2006/027369

PCT Pub. Date: Mar. 16, 2006

(65) Prior Publication Data

US 2009/0240455 A1    Sep. 24, 2009

(30) Foreign Application Priority Data

Sep. 10, 2004    (DK)    .......................... PA 2004 01381

(51) Int. Cl.
*G01D 18/00* (2006.01)
*G01J 3/00* (2006.01)

(52) U.S. Cl. .......................... 702/104; 702/85; 356/301; 356/479

(58) Field of Classification Search ................... 702/85, 702/104; 356/310, 331, 301, 479; 367/132, 367/134
See application file for complete search history.

(56) References Cited

U.S. PATENT DOCUMENTS 4,777,661 A    10/1988    Spillman, Jr.

(Continued)

FOREIGN PATENT DOCUMENTS

CA    2 490 560 A1    6/2005

(Continued)

OTHER PUBLICATIONS

U. Glombitza et al., "Coherent Frequency-Domain Reflectometry for Characterization of Single-Mode Integrated-Optical Waveguides", Journal of Lightwave Technology, vol. 11, No. 8, Aug. 1993, pp. 2377-1384.

(Continued)

*Primary Examiner*—Bryan Bui
(74) *Attorney, Agent, or Firm*—Laurence A. Greenberg; Werner H. Stemer; Ralph E. Locher

(57) ABSTRACT

The object of the invention is to provide a method of calibrating an optical FMCW backscattering measurement system that improves the precision of the measurement. The problem is solved by a method comprising the steps of A. Converting said received sensor signal to a complex received electrical signal as a function of said modulation frequency fm, said complex received electrical signal being represented by a magnitude part and a phase angle part as a function of said modulation frequency fm; B. Performing a transformation of said received electrical signal to provide a backscattering signal as a function of location between said first and second ends of said sensor and beyond said second end; C. From said backscattering signal as a function of location determining characteristics of a curve representative of said backscattering signal beyond said second end; D. Correcting said magnitude part of said received electrical signal and said phase angle part of said received electrical signal in a predetermined dependence of said curve; and E. Repeating step B) on the basis of the corrected received electrical signal.

34 Claims, 13 Drawing Sheets

U.S. PATENT DOCUMENTS

| | | |
|---|---|---|
| 5,272,334 A | 12/1993 | Sai |
| 5,825,804 A | 10/1998 | Sai |
| 6,995,840 B2 * | 2/2006 | Hagler .................. 356/310 |
| 7,359,062 B2 * | 4/2008 | Chen et al. .............. 356/479 |
| 2005/0140966 A1 | 6/2005 | Yamate et al. |
| 2005/0159915 A1 | 7/2005 | Schaumann et al. |

FOREIGN PATENT DOCUMENTS

| | | |
|---|---|---|
| EP | 0 261 834 B1 | 3/1988 |
| EP | 0 692 705 B1 | 1/1996 |
| EP | 1 548 416 A1 | 6/2005 |

OTHER PUBLICATIONS

Emir Karamehmedovic et al., "Fiber-Optic Distributed Temperarture Sensor Using Incoherent Optical Frequency Domain Reflectometry", The International Society for Optical Engineering, Photonics West, 2003, 9 pages.

International Search Report dated Jan. 26, 2006.

* cited by examiner

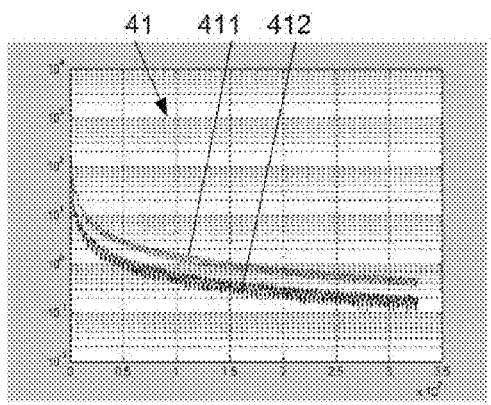
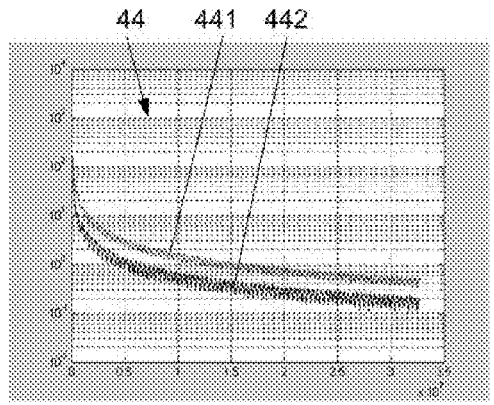
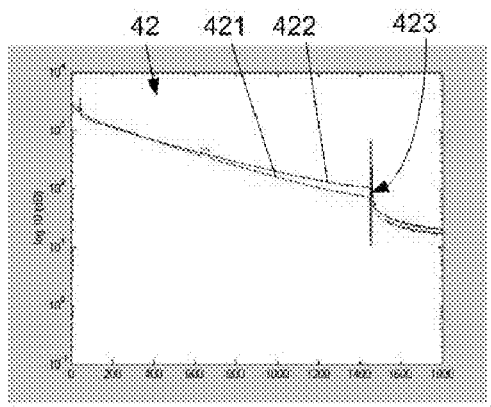
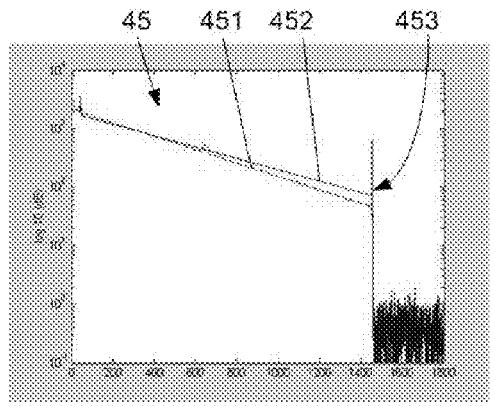
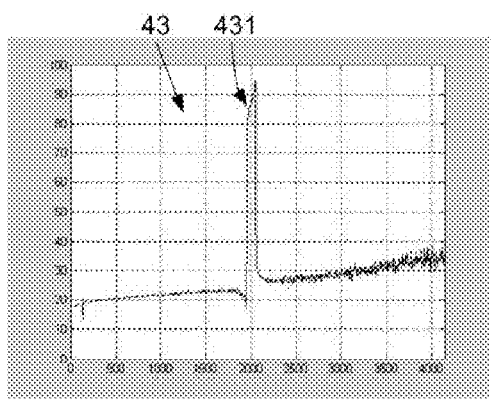
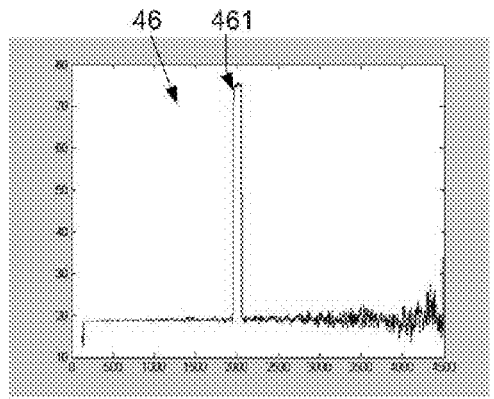
FIG. 4A          FIG. 4B

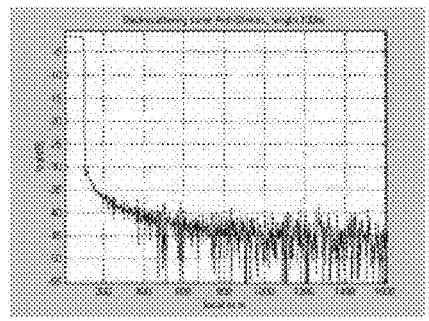
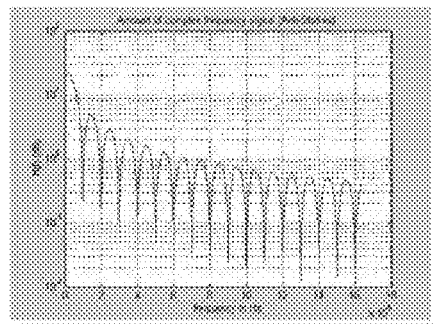
FIG. 6A              FIG. 6B
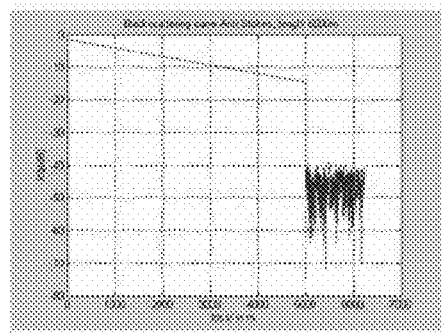
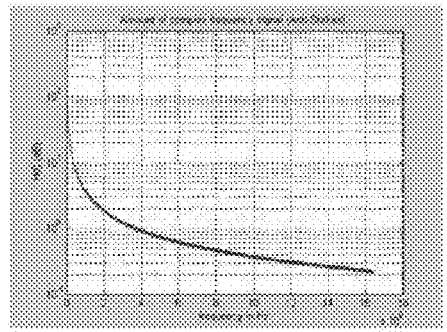
FIG. 7A              FIG. 7B
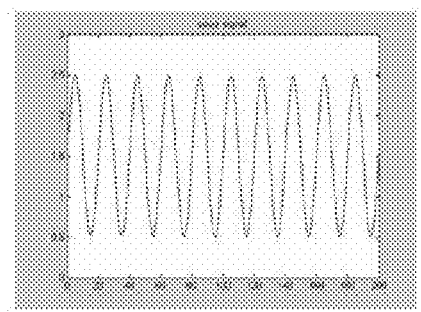
FIG. 8

CALIBRATING AN OPTICAL FMCW BACKSCATTERING MEASUREMENT SYSTEM

TECHNICAL FIELD

The invention relates to the field of measurement systems, such as optical measurement systems, e.g. systems for measurement of spatially distributed physical properties by means of a sensor, e.g. an optical sensor.

The invention also relates to a method of calibrating an FMCW backscattering measurement system, such as an optical FMCW backscattering measurement system, the system comprising an excitation and evaluation part and a longitudinally extending sensor, the sensor having a first and a second end, the excitation and evaluation part being adapted for exciting a frequency modulated light signal with modulation frequency $f_m$ to and for evaluating a sensor signal received from the first end of the sensor, the sensor being adapted for capturing a data signal based on the frequency modulated light signal from which physical parameters of spatially distributed measurement points of the sensor along its length between the first and second ends may be extracted.

The invention further relates to a backscattering measurement system, such as an optical FMCW backscattering measurement system and to a computer readable medium.

The invention may e.g. be useful in applications such as measurement of spatially distributed physical parameters, e.g. temperature, humidity, force, in large installations, e.g. along roads, in tunnels, in tubes or cables, in industrial equipment, etc.

BACKGROUND ART

The following account of the prior art relates to one of the areas of application of the present invention, distributed temperature measurement based on optical Raman backscattering. The present invention may, however, be applied to other measurement systems that are not based on optical backscattering. An example of a prior art FMCW backscattering system to which the present invention would be relevant is described in EP-1 548 416.

An optical backscattering system may e.g. comprise a modulated laser source, a sensor for capturing a spatially distributed measurement of a physical quantity (e.g. temperature, force, humidity, etc.) in the form of an optical waveguide, e.g. an optical fibre, mixing, filtering and receiving elements (including opto-electronic converters), signal processing and calculation units for transforming and evaluating the backscattered signal(s) and for determining the spatially distributed profile of the physical quantity in question.

A typical problem for an optical back scattering system is to provide an unambiguous calibration of the measurement system (including the sensor). A prior art FMCW (Frequency Modulated Continuous Wave) system for measuring a distributed temperature profile, for example an optical frequency domain reflectometry system, as e.g. described in EP-0 692 705, has to be manually calibrated in that the sensor (e.g. an optical fibre) is exposed to a number of well defined hot-spots at predetermined locations along its length for which the actual temperatures at those locations are measured with calibrated temperature sensors so that an actual profile is known.

Due to the properties of the complex frequency data (i.e. data comprise real and imaginary parts); the values of the corrected frequency data are ambiguous.

Other problems with prior art systems include contributions to measurement errors due to one or more of the following:

a) DC-Errors:

a1) The FMCW temperature method is e.g. based on the measurement of Raman backscattering of light from an optical fibre as a function of the laser frequency modulation ($f_m$). The backscattering curves of the Raman light as function of the fibre length are based on the calculation of the Inverse Fourier Transformation of an electrical photo detector signal. The algorithm of this Inverse Fourier Transformation requires the complex measurement of the backscattering signal between $f_m=0$ Hz and the maximal laser modulation frequency. The measurement of the first frequency point (DC value) for the Inverse Fourier Transformation is difficult, because this value is superimposed with the classic steady component of the photo detector signal.

a2) The DC value is not a constant. The value is dependent on the sensor properties (e.g. different lengths or different specifications of optical waveguides used as sensor, cf. FIGS. 6 and 7 and the corresponding description).

b) Errors Due to Tolerances and Nonlinear Behaviour of Components.

The FMCW Raman techniques require the fibre measurement of a very weak Raman backscattering light signal (down to the pico watt range) as a function of frequency modulated laser light over a broad frequency band ($f_m$ may e.g. be in the range from 0 Hz up to 100 MHz). The average of the intensity of the laser light is constant. Due to the weak detector signal the tolerances of optic components (laser, photo detector, filter, etc.) and electronic components (amplifier, mixer, filter, etc.) have a perceptible impact on the quality of the backscattering and resulting temperature curves. Likewise, the non-linear behaviour of optic and electronic components produces contortion in the frequency data. The result is a nonlinear contortion along the temperature profile which reduces the accuracy of the temperature measurement system.

c) Errors Due to Cross Talk Between Different Measurement Channels.

Cross talk between different measurement channels may cause an additional error in the form of random noise and nonlinear interferences in the temperature profile (cf. e.g. FIG. 10 and the corresponding description).

d) Errors Due to Ageing Effects.

Aging effects on optical and electronic components also have an impact on the quality and stability of the measurement devices due to the weak Raman detector signal and the above mentioned FMCW measurement dependence between frequency signal and temperature profile.

e) Errors Caused by a Change of the Sensor Line.

In case of a change of the optical sensor line, a preceding calibration may not be valid anymore. This is mainly caused by an impact on the DC value of the frequency data.

The above mentioned undesirable effects all have an impact on the quality and the stability of a Raman temperature measurement system. The elimination and separation of these effects is not possible with current calibration procedures. As a consequence, calibration procedures must be repeated when alteration of system qualities are noticed. This is time consuming and cost intensive. An additional weakness of current calibration procedures is the strong impact of incurred errors on the resulting measurement quality (e.g. system accuracy (precision)). This means that new applications having higher requirements to measurement precision are excluded with current systems.

OBJECTS AND SUMMARY

An object of the present invention is to provide a method of calibrating an FMCW backscattering measurement system, such as an optical FMCW backscattering measurement system that improves the precision of the measurement. Another object is to provide a calibration method that is suitable for automation. Another object is to provide a calibration method that is suitable for production of measurement systems in larger quantities. Another object is to provide a calibration method that is suitable for being used in field measurements.

Objects of the invention are achieved by the teachings described in the accompanying claims and as described in the following.

An object of the invention is achieved by a method of calibrating an FMCW backscattering measurement system, such as an optical FMCW backscattering measurement system, the system comprising an excitation and evaluation part and a longitudinally extending sensor, the sensor having a first and a second end, the excitation and evaluation part being adapted for exciting a frequency modulated light signal with modulation frequency $f_m$ to and for evaluating a sensor signal received from the first end of the sensor, the sensor being adapted for capturing a data signal based on the frequency modulated light signal from which physical parameters of spatially distributed measurement points of the sensor along its length between the first and second ends may be extracted, the method comprising the steps of A. Converting said received sensor signal to a complex received electrical signal as a function of said modulation frequency $f_m$, said complex received electrical signal being represented by a magnitude part and a phase angle part as a function of said modulation frequency $f_m$;

B. Performing a transformation of said received electrical signal to provide a backscattering signal as a function of location between said first and second ends of said sensor and beyond said second end;

C. From said backscattering signal as a function of location determining characteristics of a curve representative of said backscattering signal beyond said second end;

D. Correcting said magnitude part of said received electrical signal and said phase angle part of said received electrical signal in a predetermined dependence of said curve;

E. Repeating step B) on the basis of the corrected received electrical signal.

In step F, steps C, D, E may optionally be repeated until a predetermined criterion is fulfilled.

Between the complex measurement signal (frequency data), in step A termed 'received electrical signal as a function of modulation frequency $f_m$', and the backscattering curve, in step B termed 'the backscattering signal as a function of location between the first and second ends of the sensor and beyond the second end', a unique mathematical transformation procedure exists: The Inverse Fourier Transformation. A practical tool for fast calculation of the mathematical transformation is the Fast Fourier Transformation (FFT), respectively, the Inverse Fast Fourier Transformation (IFFT). The following description will use these abbreviations. The analysis of the backscattering curve allows a conclusion about the properties of the complex frequency data.

The complex received electrical signal is advantageously represented as discrete measurements points in digital form, e.g. as a result of an A/D-conversion (analogue to digital conversion), and e.g. stored in an appropriate data storage medium (e.g. a memory of a DSP (digital signal processor)).

In an embodiment, more than one set of data for a particular received electrical signal (e.g. a Stokes signal or an Anti-Stokes signal) corresponding to a measurement cycle are stored in memory. In an embodiment, data from a number of measurement cycles of a particular signal are averaged before a corrective calibration is performed.

In general, a measurement cycle consists of all steps for determining the temperature profile (or at least the backscattering curve) (measuring the frequency data, correct frequency data, calculation of backscattering curves, calculation of the ratio/relation of backscattering curves, calculation of the temperature profile). In an embodiment, the term 'a measurement cycle' is taken to mean one sweep of the modulation frequency of the (laser) light source.

The term 'a data set', e.g. 'a frequency data set', is in the present context taken to mean the data that represent a given signal in one measurement cycle. A 'frequency data set' may e.g. be defined by a number of complex frequency data points in the range from DC to a maximum modulation frequency (e.g. 100 MHz) with a defined frequency spacing (e.g. 8 kHz).

By iteration, a gradually refined correction of the backscattering curve(s) can be achieved. In an embodiment, the iteration procedure may comprise the following steps 1. Determine an incremental change of the magnitude of the complex received electrical signal at $f_m=0$ (DC value) and determine an incremental change of the phase offset of the whole phase characteristic (phase angle $\phi$ vs. modulation frequency $f_m$) of the complex received electrical signal; 2. Recalculate the backscattering curve; 3. Based on predefined criteria, decide whether to continue from step 1. OR to stop. In an embodiment, the correction is performed by an automated, computer controlled linearization procedure called "automated system calibration" (cf. section 5 below).

The above steps of calibration ensure an improved precision of the physical parameters being determined by the measurement system.

The results of a given corrective calibration are advantageously stored in a memory of the system for (later) use as basis for another corrective calibration either of the same type (but with other correction factors) or of another type (e.g. 'DC-error correction' vs. 'frequency calibration').

In an embodiment, the order of the different types of corrective calibration is optimised to provide the best results (as e.g. evaluated in view of the correspondence between measured and theoretically expected or practically verified results).

The term an 'FMCW backscattering measurement system' is in the present context taken to mean a Frequency Modulated Continuous Wave (FMCW) measurement system based on the frequency modulation of an electromagnetic signal (e.g. at microwave, radar or light frequencies, etc.) that is backscattered from one or more continuously scattering media or/and from one or more reflectors.

A radar FMCW system may e.g. be used for determining distance to and velocity of an object. An electrical FMCW system may e.g. be used for monitoring the spatial distribution of temperature along an electrical cable, cf. e.g. EP-1 548 416.

In an FMCW measurement system, the determination of the spatial distribution of physical values along a sensor medium is e.g. based on the IFFT of the system response in the frequency domain. To perform an IFFT, the required frequency range is from DC (0 Hz) to an upper frequency limit. The quality of the measurement is significantly dependent on the accuracy of the lowest frequency (DC), which specify the base level of the resulting signal after the IFFT. FMCW measurement devices, as e.g. described in EP-0 692 705 and EP-1 548 416, have a lower limit frequency above DC (0 Hz). Therefore the calibration procedure of the present invention aims at the determination of a correct measurement value at DC (0 Hz) and is applicable to FMCW measurement systems in general.

In a particular embodiment, the FMCW backscattering measurement system is an optical FMCW backscattering measurement system.

The term an 'optical FMCW backscattering measurement system' is in the present context taken to mean an optical Frequency Modulated Continuous Wave (FMCW) measurement system based on the frequency modulation of a light beam (pump light) that is backscattered from one or more continuously scattering optical (typically optical fibre) media or/and from one or more optical reflectors (Fresnel reflection at the fibre ends, plugs, lenses, mirrors, etc.). The backscattered light comprises the same wavelength as the pump light or/and additionally light at different wavelengths due to nonlinear optical effects. The characteristic of the backscattered light is dependent on physical (force, strain, pressure, temperature, etc.) or/and chemical (moisture, corrosion, sulphurous, etc.) or/and electromagnetic (fluorescence, radiation, etc.) parameters of the continuously scattering media or/and reflectors.

The term an 'optical FMCW backscattering measurement system' is taken to include systems based on heterodyne measurement technology (optical or electrical).

By using optical heterodyne measurement technology in the optical FMCW backscattering measurement system, the mixing of the pump signal and the backscattered signal takes place in the exit optical paths from a Michelson Interferometer, for example. These kinds of optical FMCW techniques are also termed 'OFDR techniques' or 'coherent FMCW techniques' (see e.g. U. Glombitza, E. Brinkmeyer, "Coherent Frequency Domain Reflectometry for Characterization of Single-Mode Integrated-Optical Waveguides", Journal of Lightwave Technology, Vol. 11, No. 8, August 1993).

By using electrical heterodyne measurement technology in the optical FMCW backscattering measurement system, the mixing of the pump signal and the backscattered signal take place in the electrical receiver module. These kinds of electrical FMCW techniques are also termed 'incoherent OFDR techniques' (see e.g.: Emir Karamehmedovic, U. Glombitza, "Fibre-Optic Distributed Temperature Sensing Using Incoherent Optical Frequency Domain Reflectometry", The International Society for Optical Engineering, Photonics West, 2003).

The terms 'OFDR' (optical frequency domain reflectometry) and 'optical FMCW backscattering' are used interchangeably in the present application.

The term 'correcting said received electrical signal in a predetermined dependence of said curve' is in the present context taken to mean that depending on
1. the mean value and/or
2. the slope (gradient) of the backscattering curve beyond the second, remote, end of the sensor,
3. the magnitude of the level of the DC value ($f_m=0$), and
4. the phase-offset of the phase characteristic in the frequency domain can be modified.

In an embodiment, the frequency modulation comprises the mixing of two optical signals (termed coherent OFDR).

In an embodiment, the frequency modulation of the laser comprises a modulation of the intensity of the laser light at different frequencies. Per measurement cycle the laser frequency is chirped between 0 Hz and a maximal frequency, typically 100 MHz. The frequency range is adapted to correspond to the spatial resolution of the optical FMCW device. The average of the intensity of the laser output light at the different frequency steps is typically constant. The number of frequency measurement points is dependent on the fibre length and the frequency spacing is dependent on the spatial resolution of the FMCW device.

The term 'calibrating an FMCW measurement system' (such as an 'optical FMCW measurement system') is in the present context taken to mean the process of ensuring that a measurement system is adapted to a certain level of precision by determining sources of errors and possible deviations from a standard and to ascertain the proper correction of such errors and/or deviations.

In an embodiment, the calibration is performed by the correction of received (raw) data in the frequency domain (received electrical down-converted backscattered complex signal versus laser modulation frequency $f_m$).

In an embodiment, the received sensor signal comprises first and second distinguishable parts. The term 'the received signal comprising first and second distinguishable parts' is in the present context taken to mean that based on the received signal it is possible to identify contributions from a specific part of the sensor (e.g. an optical sensor), e.g. after a conversion, such as an optical to electrical conversion, and/or e.g. after a further signal processing of the optical or electrical signal (e.g. involving a Fourier transformation). If e.g. a length of an optical waveguide is used as sensor, the term is to be understood so that it is possible to derive the contribution to the signal from that length of waveguide, so that information about physical properties (e.g. temperature) for that length may be extracted based on the signal and so that properties of the signal for regions beyond the length of the waveguide may be used for corrective purposes.

In an embodiment, the transformation of the received electrical signal to provide a backscattering signal as a function of location between said first and second ends of said sensor and beyond said second end is an inverse Fourier transformation.

In an embodiment, the sensor is an optical waveguide. In an embodiment, the sensor is an optical fibre, e.g. a silica glass optical fibre. Alternatively, the sensor may be an electrical cable (e.g. a coaxial cable) or any other spatially distributed sensor medium.

When in step F, said predetermined criteria are that said backscattering signal beyond said second end of said sensor can be approximated by a straight line with a slope of approximately 0, it is ensured that a further improved backscattering signal is provided thereby improving the accuracy of the physical parameter that is extracted. It is further advantageous that the mean value is approximately 0. The data representation is preferably in 'number of samples' (in a linear data representation).

The term 'approximately 0' is in the present context to mean that the tolerances/deviations from 0 of the mean value and the gradient/slope of noise beyond the end of fibre in the linear representation of backscattering data is so slight that the backscattering curves in the logarithmic representation in the area of sensor fibre with a defined temperature are linear, and the attenuation along the sensor fibre is constant and accords with the theoretical value of fibre attenuation. The values of acceptable deviation/tolerances from 0 determined in this way are the convergence criteria of the iteration method. They are applicable to any other sensor fibres.

In an embodiment, said slope is smaller than a specific convergence value. In an embodiment, said slope is approximately 0, such as less than 0.5 samples, such as less than 0.05 samples, such as less than 0.005 samples.

In an embodiment, said predetermined criterion comprise the criterion that the mean value of the samples for a part of or all of said backscattering signal beyond said second end is smaller than a specific convergence value such as approximately 0, such as less than 0.5 samples such as less than 0.05 samples.

In an embodiment, the term 'the mean value is approximately 0' is taken to mean that for a given incremental change of the magnitude of the received electrical signal at $f_m=0$ in step D, the mean value of the backscattering signal beyond the second end of the sensor representing the noise level changes sign when recalculated in step E.

In an embodiment, in step D, said correction of said magnitude part of said received electrical signal comprises the sub-step D1 of correcting the magnitude data by an initial correction amount $\Delta H_0(0)$ at the modulation frequency $f_m$ equal to 0.

In an embodiment, in step D1 said initial correction amount $\Delta H_0(0)$ is set to a predetermined value, e.g. an estimate.

In an embodiment, in step D1 said initial correction amount $\Delta H_0(0)$ is determined by the amount of deviation of the mean value of noise in the backscattering curve from 0.

In an embodiment, in step D, said correction of said phase angle part of said received electrical signal comprises the sub-step D2 of determining an initial off-set value $\Delta\phi_0(0)$ of the phase angle of the received electrical signal as a function of said modulation frequency $f_m$ around $f_m=0$; and by subsequently correcting data representing said phase angle of the received electrical signal as a function of modulation frequency $f_m$ with said off-set value.

In an embodiment, in step D2 said initial off-set value $\Delta\phi_0(0)$ is set to a predetermined value.

In an embodiment, in step D2, said initial off-set value $\Delta\phi_0(0)$ is determined by linear extrapolation of the phase angle data for $f_m \to 0$ Hz.

The results of the iterative linearization procedure (in the following termed "automated system calibration" and described in more detail in section 5 below) are the correction factors for a) the DC value correction procedure of step D1 and
b) the phase-offset-correction procedure of step D2.

In this way the physically limited precision of both procedures (D1 and D2) are improved significantly. Oddments of errors (residual errors), which are specific for a dedicated system including the fibre, are eliminated by using the results of the "automated system calibration" in the DC value correction and phase-offset-correction procedure. In contrast to the DC value correction and phase-offset-correction procedure, which have to be executed during each measurement cycle, the "automated system calibration" has to be done only once for a dedicated measurement system including the fibre.

In an embodiment, steps A, B, C, D, and optionally E of said calibration procedure are performed in each measurement cycle.

In an embodiment, the 'automated system calibration' is performed in some, a majority or in all of the measurement cycles.

In an embodiment, step D further comprises the sub-steps D3 of determining a residual correction factor $\Delta H_{res}(0)$ and D4 of determining a residual off-set value $\Delta\phi_{res}(0)$, both sub-steps being based on backscattering data calculated from data representing said magnitude part and said phase angle part, respectively, as a function of said modulation frequency $f_m$ after correction by said initial correction amount $\Delta H_0(0)$ of sub-step D1 and said initial off-set value $\Delta\phi_0(0)$ of sub-step D2, respectively, wherein in sub-step D3 the value of said residual correction factor $\Delta H_{res}(0)$ is based on the mean value of the average level of said backscattering signal beyond said second end of said sensor, and in sub-step D4 the value of said residual off-set value $\Delta\phi_{res}(0)$ is based on the value of the slope of said backscattering signal beyond said second end of said sensor.

In an embodiment, said correction steps D3 and D4 are based on averaged backscattering curves, such as more than 5 measurements, such as more than 10 measurements such as more than 20 measurements.

The term 'averaged backscattering curves' is in the present context e.g. taken to mean the (linear) average of a number of backscattering curves at each point in the spatial regime.

In an embodiment, the method further comprises the steps of A1. Determining an off-set value of the phase angle of the received electrical signal as a function of said modulation frequency $f_m$ around $f_m=0$; and A2. Making a compensation of said phase angle data based on said off-set value. Thereby it is ensured that the accuracy of the measured physical parameter profile can be further improved.

When in step A1, said off-set value is determined by linear extrapolation of the phase angle data for $f_m \to 0$ Hz, it is ensured that a procedure that is easy to implement and automate is provided. By subtracting the linearly extrapolated amount $\Delta\phi(f_m=0)$ from all phase angle versus frequency data (whereby the value of the phase angle at $f_m=0$ is set to 0°) and recalculating the backscattering data and the physical parameter profile, an improved accuracy of the physical parameter data is provided.

In an embodiment, the phase correction is performed before the DC-correction in the calibration procedure, i.e. so that steps A1 and A2 are performed before step B. This has the advantage of improving the quality of the combined correction.

In an embodiment, a compensation of cross talk between measurement channels (cf. section 8 below) is performed prior to DC- and phase-offset-correction procedures. After the execution the "automated system calibration", the order of procedures is arbitrary.

In an embodiment, the sensor and the excitation and evaluation part of the measurement system are calibrated together. This has the advantage of providing a calibration that takes account of contributions to the correction of the received frequency data originating from the particular sensor characteristics (as well as those originating from the excitation and evaluation part and the measurement method in general (e.g. the mathematical transformations).

In a particular embodiment, calibration is performed using a standardized sensor, such as a standardized optical sensor, with well-known characteristics.

When said calibration is performed if characteristics of the sensor, such as optical characteristics of the sensor, changes, it is ensured that the characteristics of the sensor such as its length, attenuation, chemical composition (and thus scattering properties), etc. are included in the calibration.

In an embodiment, said calibration is performed if other characteristics of the system have or are suspected to have changed.

In an embodiment, said calibration method is performed for signals representative of Anti-Stokes as well as for Stokes signals.

In an embodiment, the measurement system is a Raman backscattering measurement system adapted for measuring a spatially distributed temperature profile.

In an embodiment, the extracted physical parameters of spatially distributed measurement points of the sensor along its length are used to calculate a temperature profile of the sensor along its length. Alternatively other parameters, such as moisture, corrosion, sulphurous, pressure, force, radiation, etc. could be calculated.

In an embodiment, the measurement is based on Raman backscattering. Alternatively, it could be based on Rayleigh backscattering.

In an embodiment, the received sensor signal comprises a Stokes Raman backscattered signal. In an embodiment, the received sensor signal comprises an Anti-Stokes Raman backscattered signal. In an embodiment, the calculation of the temperature profile is based on the Stokes and Anti-Stokes Raman backscattered signals.

The profile achieved by the measuring system may thus be absolutely calibrated (for the particular measurement system including the sensor) and possible measurement defects of the system (incl. a DC-error) may be corrected in the frequency data e.g. by software procedures.

In an embodiment, the method additionally comprises a cross talk correction procedure (cf. section 8 below) comprising the steps of G1. Determining and storing cross talk between measurement channels of the measurement system with a specific measurement procedure during system manufacture, and G2. Within each measurement cycle of normal operation subtract the memorized crosstalk data from the measured complex frequency data.

In an embodiment, steps G1 and G2 are carried out prior to other corrective calibration steps.

In an embodiment, the sensor comprises a reference part serially connectable to a measurement part. In an embodiment the reference part is a well characterized optical fibre of well defined length, optionally stored at a well defined temperature.

In an embodiment, the method additionally comprises steps that take into account the theoretical convolution between the frequency and spatial domain, wherein in Step H1, the expected complex frequency curve is determined from a mathematical model, and a complex frequency error function constituted by the complex ratio of the measured data of the FMCW backscattering system $S_{RM}$ to the calculated complex frequency function $S_R$ is determined, and stored in a memory, and in Step H2 at the start of a following measurement cycle, the measured frequency data $S_{RM}$ is corrected with the complex frequency error function.

In an embodiment, steps G1 and G2 are carried out after other corrective calibration steps, preferably as the last corrective calibration steps.

The present disclosure further deals with an FMCW backscattering measurement system, such as an optical FMCW backscattering measurement system, comprising a computer readable medium having stored thereon a computer readable program code for executing a calibration method as described above, in the section 'Mode(s) for carrying out the invention' and in the claims.

The term 'a computer readable medium' is in the present context taken to mean any appropriate means for storing program code including a diskette, a CD-ROM, a flash memory, a hard disk drive, RAM, etc. In an embodiment, the computer readable medium is part of or integrated with a PC, a micro-processor (e.g. a DSP).

The present disclosure further deals with a computer readable medium having stored thereon a computer readable program which when run on a computer can execute a calibration method as described above, in the section 'Mode(s) for carrying out the invention' and in the claims.

The term 'a computer' is in the present context taken to mean any appropriate processing unit for executing program code, including a PC, a micro-processor, a DSP, etc.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 4 shows measurement data of a Raman backscattering temperature measurement system with (FIG. 4a) and without (FIG. 4b) a phase error due to component tolerances and degradation;

FIG. 6 shows measurements of the Raman Anti-Stokes light of a waveguide sensor with a length of 100 m, FIG. 6a showing the backscattering curve (logarithmic scale) and FIG. 6b showing the corresponding Fourier transformed frequency signal (magnitude function of the complex measurement signal);

FIG. 7 shows measurements of the Raman Anti-Stokes light of a sensor with a waveguide length of 5000 m, FIG. 7a showing the backscattering curve (in a logarithmic scale) as a function of location in the fibre and FIG. 7b the magnitude function as a function of frequency;

FIG. 8 shows the reference signal at the modulation frequency $f_2=10$ kHz as example;

The figures are schematic and simplified for clarity, and they just show details which are essential to the understanding of the invention, while other details are left out.

DETAILED DESCRIPTION OF THE PREFERRED EMBODIMENTS

1. An Optical Backscattering Measurement System

FIG. 1 shows schematic illustrations of an optical FMCW measurement system comprising an excitation and evaluation unit and an optical sensor.

Figure 1A:
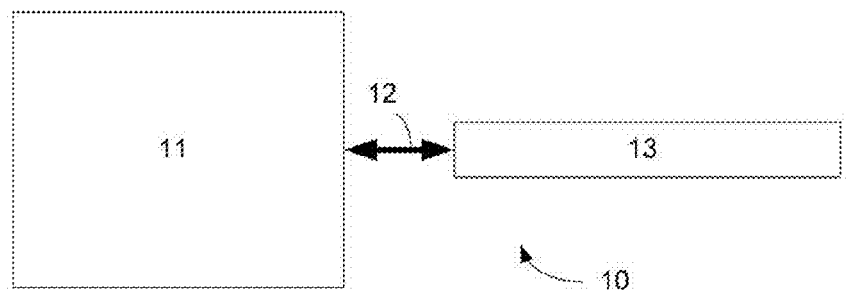
FIG. 1 shows schematic illustrations of an optical FMCW measurement system comprising an excitation and evaluation unit and an optical sensor.
Figure 1B:
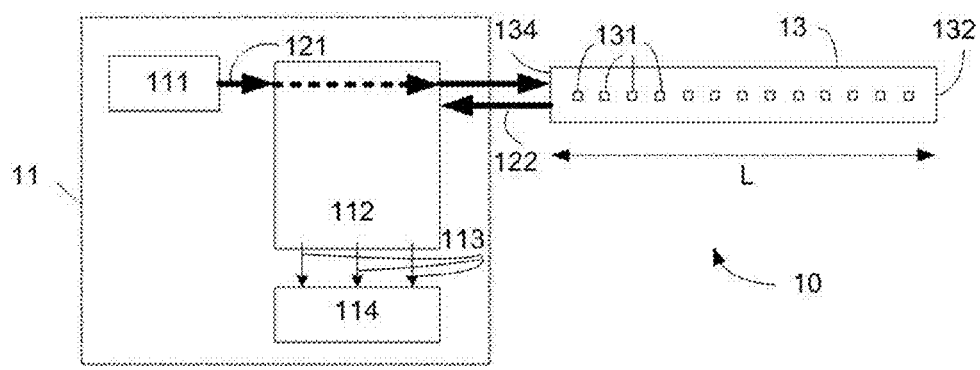

In FIG. 1a an optical FMCW backscattering measurement system 10 comprising an excitation and evaluation unit 11 is shown to optically interact (as illustrated by arrow 12) with optical sensor 13. In FIG. 1b excitation and evaluation unit 11 of the measurement system 10 is shown to comprise light source 111, e.g. a laser such as a semiconductor laser (e.g. a 980 nm pigtailed semiconductor laser as typically used for optical fibre amplifiers for optical telecom data transmission systems) exciting a frequency modulated light signal 121 into a first end 134 of optical sensor 13 (e.g. a length L of optical fibre, such as a silica fibre), the sensor having a second end 132, remotely located relative to the light source 111. The light signal 121 from light source 111 may optionally be modified (e.g. filtered and/or focused) before entering optical sensor 13 (as indicated by the dotted arrow within receiving unit 112). The optical component(s) (e.g. filters, splitters, lenses, etc.) responsible for the modification may fully or partially form part of receiving unit 112 or fully or partially be located elsewhere (e.g. as one or more separate units or forming part of sensor 13). Backscattered light signal 122 from optical sensor 13 is shown to be received by receiving unit 112 and signals 113 are forwarded from receiving unit 112 to processing and evaluation unit 114. The (backscattered) received light signal 122 comprises a data signal based on the frequency modulated light signal 121 from which physical parameters of spatially distributed measurement points 131 along the sensor 13 may be extracted. The measurement points 131 are distributed over a length L of the optical sensor 13.

Figure 1C:
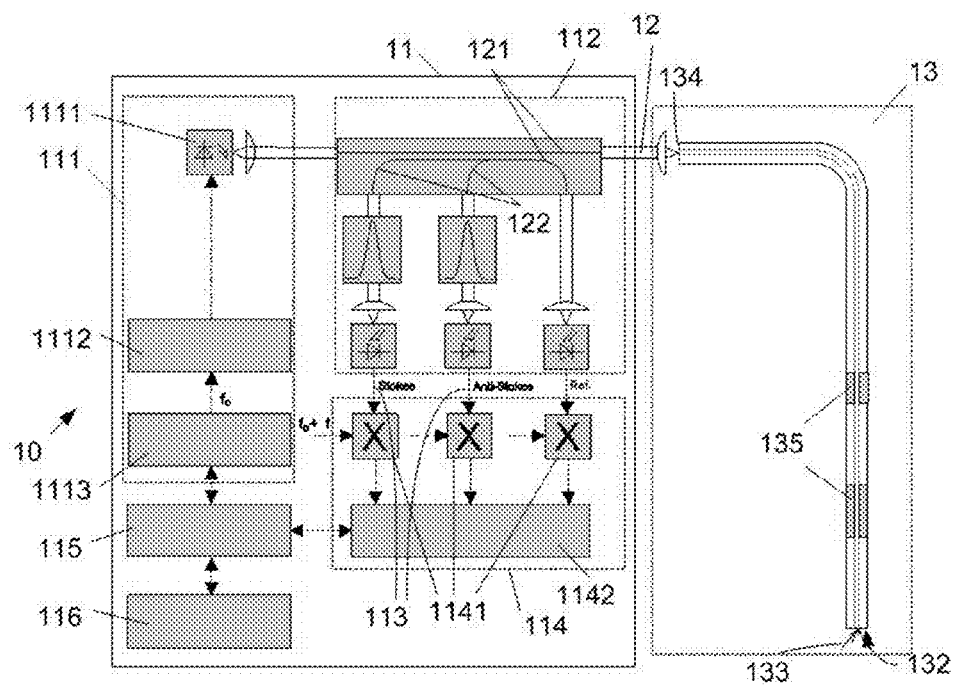

FIG. 1c shows an exemplary optical FMCW backscattering measurement system 10 in the form of an optical temperature measurement system based on Raman back scattering. It should be mentioned that the calibration method may just as well be used for Rayleigh scattering (for example for the measurement of humidity or force (as e.g. described in EP-692705)) or other forms of scattering providing an appropriately sized backscattering signal).

The temperature measurement system 10 of FIG. 1c comprises an excitation and evaluation unit 11 comprising light source module 111 (comprising frequency generator 1113, laser 1111, and laser driver 1112), an optical receiver 112 (comprising filters and photo detectors as indicated by well-known symbols), an electrical receiver and evaluation unit 114 (comprising trans-impedance converters, mixers 1141, amplifiers, band pass filters, analogue-digital (A/D) converters and signal processing units 1142) and a temperature sensor 13 in the form of an optical fibre (possibly including input/output coupler components for coupling the light signal 12 in/out of the optical fibre). Possible sources of heat 135 are indicated in the sensor. The measurement unit 11 internally has an additional length of optical fibre used as a reference for the temperature calculation. This optical reference fibre is for practical reasons wound on a fibre spool which is located between the optical module 112 and the sensor 13. An optical switch may e.g. be used to measure the optical fibre 13 from both ends (134 and 132) to obtain optical fibre attenuation corrections. An additional option is to use an optical switch to measure several optical fibres with the same measurement unit (excitation and evaluation part 11). The light must be launched sequentially into the first end 134 of each of the multitude of sensors. The optical switch may be located between the reference spool and the sensor 13. These optional additional optical components (reference spool and optical switch) are not shown in FIG. 1. The system of FIG. 1 further comprises processing unit 115 and user interface 116. Cooperation between the various functional blocks is indicated by arrows.

The system comprises in the embodiment shown in FIG. 1c three channels, i.e. in addition to the two measurement channels (Anti-Stokes and Stokes), an additional reference channel. The output of the laser is amplitude modulated by a sinus signal whose frequency ($f_o$ in FIG. 1c, elsewhere termed $f_m$) is swept from a start frequency (e.g. 0 Hz) to an end frequency (e.g. 100 MHz) within a measurement time interval by means of a HF modulator. The resulting frequency modulated laser light 121 is coupled via the optical module 112 into a first end 134 of the optical waveguide 13. The light (including the Raman light) 122 which is continuously backscattered from every part (cf. points 131 in FIG. 1b) along the length of the fibre 13 is spectrally filtered in the optical module and converted into electrical signals via photo detectors. A part of the light from the light source module 111 is reflected at the second 132 (remote) end of the optical fibre and a part 133 is transmitted. The received (measurement) signals 113 are amplified and mixed into the low frequency spectral range (LF range) providing a received (backscattered) electrical signal as a function of the laser modulation frequency $f_m$. The Inverse Fourier transform of the averaged LF signals result in two Raman backscattering curves (Anti-Stokes and Stokes). The amplitudes of these backscattering curves are proportional to the intensity of the Raman scattering along the length of the optical fibre. The fibre temperature along the sensor cable is a result of the amplitude relationship (ratio) of the signals of the two measurement channels. Such a system and its use for measuring a distributed temperature or humidity or force profile is described in EP-0 692 705 and is commercially available in the form of a DTS-system (DTS=distributed temperature sensing) such as a controller OTS 40P from LIOS Technology GmbH, Köln, Germany.

2. 'Frequency Data'→'Backscattering Data'→'Temperature Profile'

2.1 Measurement Data

The calculation of the standardised backscattering curves $S_R(z)$ is based on an Inverse Fourier Transformation of the measured complex frequency curve (comprising real and imaginary parts, e.g. representing magnitude and phase, respectively, of the complex data), cf. equation (I) below. To perform the transformation, the (complex) data must be measured as a function of laser modulation frequency $f_m$ (respectively of standardised location frequency variable $$v = \frac{2 \cdot f}{v_{gr}})$$

from a start frequency (e.g. 0 Hz) to an end frequency (e.g. 100 MHz).

The measured value at 0 Hz (termed the DC-value) poses problems. This value is a superposition of two contributions, one originating from the average value of the output power of the laser (without any modulation) and the other from the average value of the backscattered Raman light signal from the optical fibre. I.e. one contribution is independent of the sensor and the other depends on the sensor.

Figure 2A:
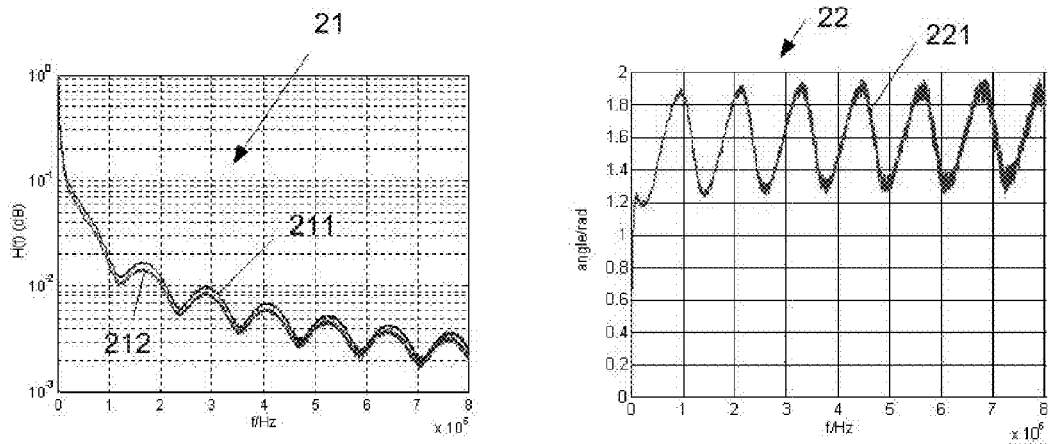
FIG. 2 shows measurement data from a Raman backscattering system for measuring a distributed temperature profile, FIG. 2a (left) illustrating the magnitude and FIG. 2a (right) the phase of the complex received (converted electrical) signals of the Anti-Stokes and Stokes light in the frequency domain, FIG. 2b showing the Fourier transformed signals in the spatial regime (the corresponding backscattering curves) and FIG. 2c the derived distributed temperature curve.
Figure 2B:
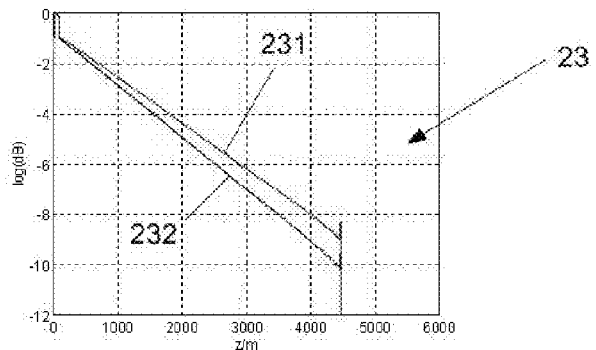
Figure 2C:
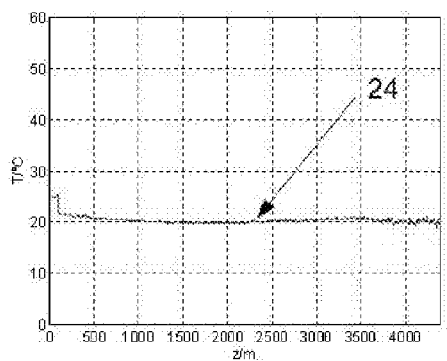

FIG. 2 shows measurement data from a Raman backscattering system for measuring a distributed temperature profile, FIG. 2a (left) illustrating the magnitude and FIG. 2a (right) the phase of the complex received (down-converted electrical) signals of the Anti-Stokes and Stokes light in the frequency domain, FIG. 2b showing the Fourier transformed signals in the spatial regime (the corresponding backscattering curves) and FIG. 2c the derived distributed temperature curve.

FIG. 2a (left) shows magnitudes (in dB) of the complex received frequency data signals 21 representing the backscattered Anti-Stokes 212 and Stokes 211 signals as a function of modulation frequency $f_m$ from 0 to 8 MHz.

The magnitudes of the complex frequency data are calculated as follows. The magnitude of a complex number $Z = a + jb$ is the root of the sum of the square of the real part (a) and the square of the imaginary part (b) of the complex function Z:

$$Z = a + jb = |r| \cdot \exp\left(-j\frac{b}{a}\right)$$

$$|r| = \sqrt{a^2 + b^2}$$

The phase is the angular relationship between the imaginary part (b) and real part (a) of the complex number Z.

FIG. 2a (right) shows the corresponding phases 22 of the complex received frequency data signals 221 representing the backscattered Anti-Stokes and Stokes signals (the two signals are not distinguishable in the shown plot) as a function of modulation frequency $f_m$ from 0 to 8 MHz.

FIG. 2b shows the backscattering curves 23 (Stokes 232 and Anti-Stokes 231) derived from the complex received signals of FIGS. 2a and 2b, and FIG. 2c shows the resulting temperature profile T(z) 24 (temperature T in ° C. vs. fibre length coordinate z from 0 to 4500 m).

2.2 Mathematical Framework

The time (t) dependent intensity $dP_R(t)$ of the Raman backscattered signal may be expressed as follows:

$$dP_R(t) = \zeta_R \cdot \rho_R \cdot e^{-2(\alpha_P(z) + \alpha_R(z))} \cdot P_P(t - 2z/v_{gr}) dz$$

where R may represent Stokes or Anti-Stokes specific parameters, respectively, $\zeta_R$ takes into account various losses (filter, coupler, etc.), $\rho_R$ is the Raman backscattering factor, $\alpha_p$ is the attenuation coefficient in the optical waveguide at wavelength $\lambda_p$ ($\lambda_p$ being the laser pump light), $\alpha_R$ is the attenuation coefficient at the different Raman light wavelengths (Stokes and Anti-Stokes), $P_P$ is the optical power of the laser source, z is the spatial coordinate along the length L of the optical waveguide considered, $v_{gr}$ is the group velocity of light.

The total scattering power of each respective Raman channel is obtained by integration along the fibre length L.

Including the sinusoidal intensity modulation of the laser, the signal received by the excitation and evaluation unit may be expressed as:

$$P_R(t) = \zeta_R \cdot \hat{P} \int_0^L \rho_R \cdot e^{-2(\alpha_P(z) + \alpha_R(z))}(1 + m \cdot \cos(2\pi \cdot f(t - 2z/v_{gr}))) dz$$

where $\hat{P}$ is the DC amplitude of the laser light and m is the modulation depth of the laser (cf. e.g. FIG. 8) and f is the frequency of the modulation signal (termed $f_m$ elsewhere in the application). The optical output of the laser (pump light) $P_P$ is represented by:

$$P_P(t) = \hat{P}(1 + m \cdot \cos(2\pi \cdot f \cdot t))$$

Development of the scattering power of each respective Raman channel to Inverse Fourier-integral:

$$P_R(t) \stackrel{!}{=} P_{RO} + \Re\{p_R(f) \cdot e^{j2\pi \cdot f \cdot t}\}$$

with $$P_{RO} = \zeta_R \cdot \hat{P} \cdot \int_0^L \rho_R \cdot e^{-2\alpha_{PR}(z)} dz = \zeta_R \cdot \hat{P} \int_0^L \rho_R \cdot e^{-2(\alpha_P(z) + \alpha_R(z))} dz$$

$$p_R(f) = \zeta_R \cdot \hat{P} \cdot m \cdot \int_0^L \rho_R(z) \cdot e^{-2\alpha_{PR}(z)} \cdot e^{-j2\pi \cdot (2 \cdot f/v_{gr}) z} dz$$

where $P_{RO}$ is the DC value corresponding to the operation point of the laser (m=0) and $p_R(f)$ is the complex measurement signal of the Raman light as function of laser modulation and $\Re$ denotes the real part of a complex figure or function. The '!' above the equality sign is a special notation of the formula as Fourier Integral. Notice that an additional DC part comes from the real part of the complex figure at f=0 (Re[$p_R$(0)]≠0).

If $$v = \frac{2 \cdot f}{v_{gr}}$$

is introduced as a standardised location frequency variable, the following standardized detector signal $S_R$ results:

$$S_R(v) = \int_0^L \rho_R(z) \cdot e^{-2 \cdot a_{PR}(z)} \cdot e^{-j2\pi \cdot v \cdot z} dz$$

with $$S_R(v) = \frac{p_R(v)}{\zeta_R \cdot \hat{P} \cdot m}$$

which by Inverse Fourier transform leads to $$s_R(z) = \int_{-\infty}^{+\infty} S_R(v) \cdot e^{j2\pi \cdot v \cdot z} dv = \rho_R(z) \cdot e^{-2 \cdot a_{PR} \cdot z} \quad \text{Eq. (1)}$$

representing a theoretical calculation of the Raman Backscattering curve as function of the location (cf. e.g. FIG. 2b). The Raman backscattering curves describe the propagation of the backscattering light intensity along the optical fibre.

3. DC-Error Correction

For the inverse Fourier transformation we need only the DC value of $\Re\{p_R(f) \cdot e^{j2\pi f t}\}$.

This may be determined using a special measurement procedure, cf. below. The DC-value is composed of a part related to the average value of the CW-signal of the laser (which may be directly measured) and a part originating from the backscattered light in the measurement channels (which is not directly measurable). In an embodiment, the method may be arranged to substantially compensate for effects originating from ageing of components (e.g. the laser diode) or tolerances on the electronic components. This may be achieved by using different independent measurements to find parameters to calculate the DC value in the right form.

Due to the finite numerical accuracy of the calculation method, an apparatus-specific residual error is present. This error may have a significant impact on the distributed temperature profile and also on the temperature calibration.

Figure 3A:
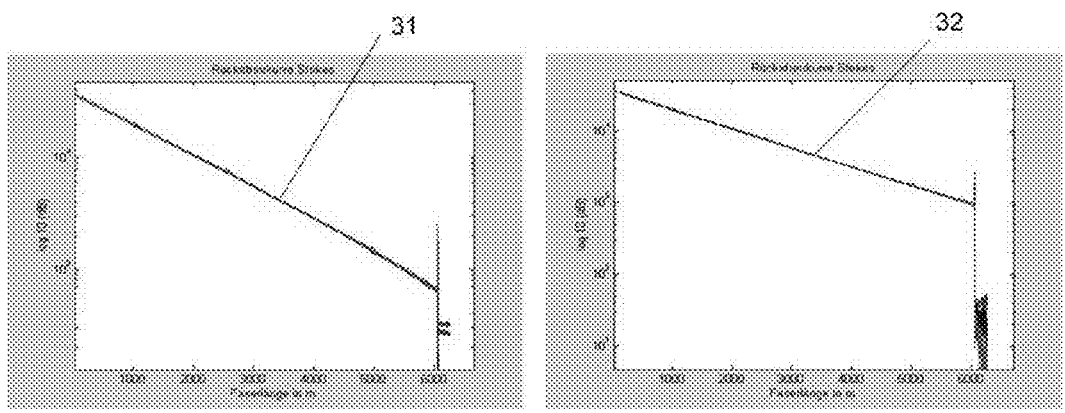
FIG. 3 shows the impact of the DC error on the Stokes and Anti-Stokes signals of a Raman backscattering temperature measurement system, FIGS. 3a and 3b showing the Stokes and Anti-Stokes channels, respectively, with (left figures) and without (right figures) DC error.
Figure 3B:
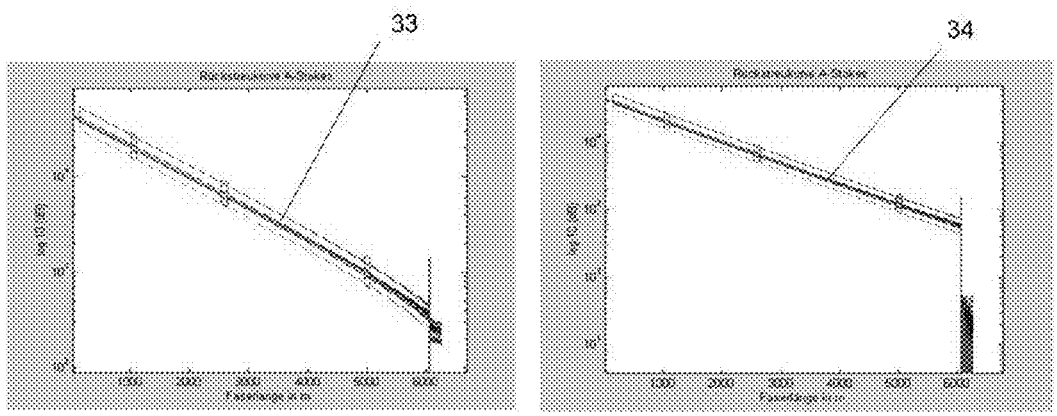

FIG. 3 shows the impact of the DC error on the Stokes and Anti-Stokes signals of a Raman backscattering temperature measurement system, FIGS. 3a and 3b showing the Stokes 31, 32 and Anti-Stokes channels 33, 34, respectively, with (left figures, 31, 33) and without (right figures, 32, 34) DC error.

It is seen that the backscattering curves corrected for the DC error (right) show improved linearity compared to the non-corrected curves (left).

The correct DC value of the Raman measurement detector signal can be obtained by using different independent measurements to find the parameters for the calculation of this DC value.

The FMCW formalism in the frequency domain allows to measure the phase delay term of the Raman backscattering light along the fibre. In the spatial domain (after the IFFT) the corresponding signal is the group velocity term of the Raman light. Due to the modulation properties of laser sources (intensity modulation by different frequencies at a fixed operation point), the complex detector signal at $f_m=0$ Hz (DC-value) contains an additional term which is independent of the phase delay term of the Raman backscattering light. This term is undesirable by the IFFT and produces the above mentioned DC error. This DC error has a strong impact and produce disturbances in the backscattering curves and also by the calculation of the temperature curves.

The task is to determine unknown parameters of the above mentioned equation at different frequencies. The unknown parameters are, the contribution to the DC value caused by the operating point of the laser ($U_{DC1}$), and the contribution to the DC value caused by the modulation for frequencies down to zero Hz ($U_{DC2}$). There are different possible ways. The following is an example:

$$P_R(t) \stackrel{!}{=} P_{R0} + \Re\{P_R(f) \cdot e^{j2\pi \cdot f \cdot t}\}$$

$$U_{Raman} \sim P_{R0} + \Re\{p_R(f) \cdot e^{j2\pi \cdot f \cdot t}\}$$

$$U_{Raman} \sim U_{DC1} + U_{DC2}$$

U is the voltage of the measurement signal after the analogue-digital converter. The voltage U is directly proportional to the current of the photo detector (i.e. to the intensity of the optical Raman backscattered light).

With a first measurement at any modulation frequency ($f=f_2$, e.g. 3 kHz) of the laser source in the reference channel, we can determine the modulation depth m of the laser (see FIG. 8).

FIG. 8 shows the reference signal at the frequency $f_2=10$ kHz. The digital signal allows us to calculate the DC value (by addition of the sampling values divided to the number of data samples) and the AC values. From these values the modulation depth m can be derived.

In a second step at f=0, a DC measurement whose result is the sum of $U_{Raman}$ (f=0) is made.

With a third measurement at $f=f_1$ (e.g. 8 kHz?) we measure the DC value which is termed $U_{DC1}$. Only the DC value caused by the operating point of the laser is measured (e.g. electronically DC-coupled).

A final step is the calculation of the DC value ($U_{DC2}$) by the following equation:

$$U_{DC2} = (U_{Raman}(f=0) - U_{DC1})$$

The above disclosed method of correcting the DC-value has the advantage of being relatively fast and thus possible to carry out in a measurement cycle of reasonably short duration.

Figure 11A:
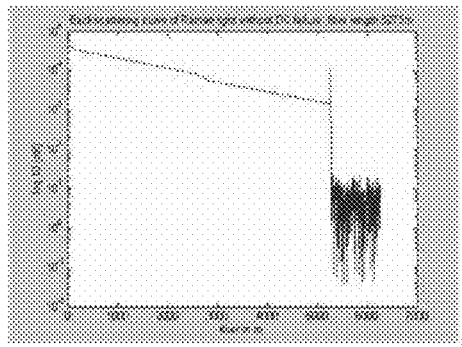
FIG. 11 shows backscattering curves for an optical waveguide sensor of a fixed length with and without DC-errors, FIGS. 11a and 11b showing the backscattering curve of an optical fibre with a length of 5273 m without DC error, the vertical 'Y-axis' being on a logarithmic scale and a linear scale, respectively, and FIG. 11c showing the backscattering curve of an optical fibre with a length of 5273 m with DC error (logarithmic scale of the Y-axis), FIG. 11d showing the backscattering curve of an optical fibre of length 4415 m with phase-offset error (the vertical 'Y-axis' being on a linear scale), and FIG. 11e showing the backscattering curve of the optical fibre of FIG. 11d without phase offset error (linear scale of the Y-axis)
Figure 11B:
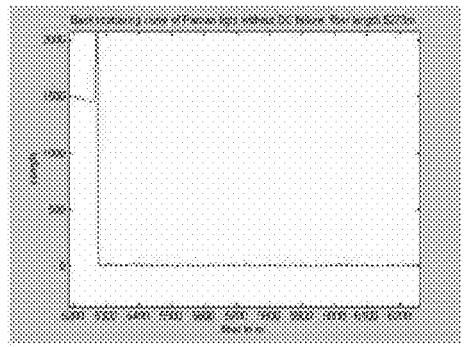
Figure 11C:
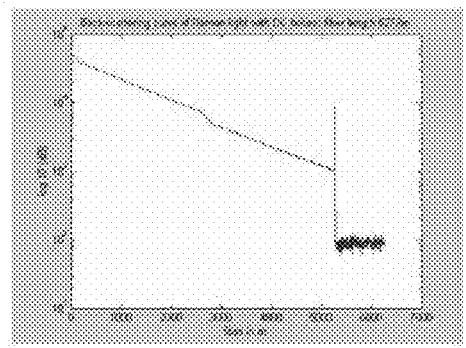

The description of the influence of the DC-error (FIG. 3) shows that the errors influence the complex frequency data and the backscattering data and is observable in the non-linearity of the backscattering curves (including in the part beyond the second, remote, end of the optical sensor waveguide (e.g. 134 in FIG. 1), cf. FIGS. 11a, 11b, 11c.

To diminish or remove the two mentioned residual errors, the course of the noise in the backscattering data corresponding to the part beyond the remote end of the optical waveguide is analysed for both Stokes and Anti-Stokes data.

In the ideal case, using frequency data free of errors would result in backscattering curves comprising a constant noise level in the part of the curve representing the region beyond the remote end of the waveguide. The course of the noise in this region should ideally be represented by a straight line with a slope/gradient of 0.

4. Phase Error Correction

The following section describes a procedure for correcting the phase error in the complex received frequency data due to component tolerances and non linear behaviour of the components.

The measurement system in FIG. 1c has three separate measurement channels. Different tolerances and ageing effects of the electronic components of the individual channels result in 'induced' phase differences of the corresponding signals which lead to non-linear backscattering curves and again influences the resulting profile of the physical parameter to be determined by the system (in this case temperature).

FIG. 4 shows measurement data of a Raman backscattering temperature measurement system with (FIG. 4a) and without (FIG. 4b) a phase error due to component tolerances and degradation.

FIG. 4a shows an example with a (large) phase error in the complex frequency measurement data. The top figure represented by reference numeral 41 shows the magnitude (in units of voltage, which is proportional to the intensity of the photo detector signal) of both complex measurement signals 411, 412 (representing Anti-Stokes and Stokes, respectively as function of measurement point) as a function of the frequency. The middle FIG. 42 shows the backscattering curves 421, 422 after the Fourier Transformation (representing Anti-Stokes and Stokes, respectively), i.e. a measure of the optical power [dB] vs. location [m] (i.e. distance from the excitation and evaluation unit). The kink 423 in the curve around 1450 m indicates the impact due to phase errors near the fibre end. The phase error produces a nonlinear behaviour with disturbances also in the temperature [° C.] curve versus location [m] data as shown on the bottom FIG. 43. An elevated temperature is indicated by the peak 431 around 2000 m.

Figure 5A:
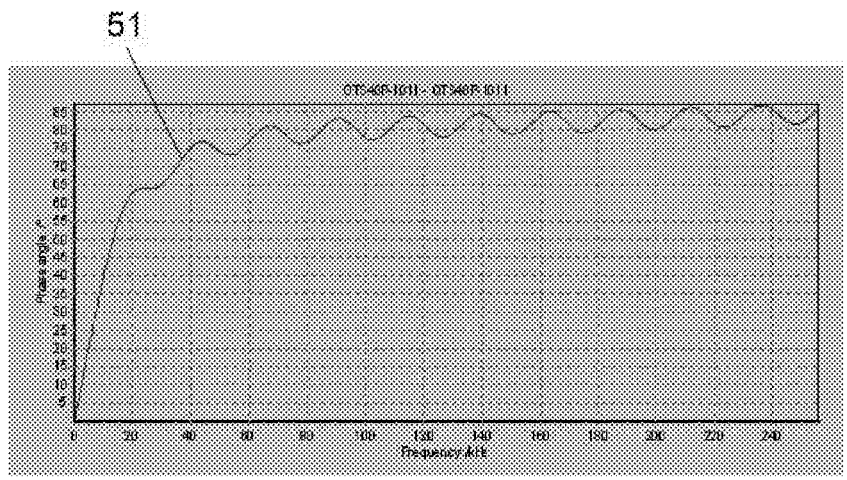
FIG. 5 shows the phase function of the received (converted electrical) signal of a Raman backscattering temperature measurement system, FIG. 5a showing a frequency range from 0 to 260 kHz and FIGS. 5b and 5c details of the curve in a frequency range from 0 to 30 kHz with and without offset error, respectively.

The corresponding phase angle [°] curves vs. frequency [kHz] from the Stokes channel are as an example shown in FIG. 5a, reference numeral 51 with an enlargement view (FIG. 5b), graph 511. The error impact is identifiable at the beginning of the graph. Instead of a linear increase, the phase contains a phase offset (identifiable by linear extrapolation of the curve (e.g. from 1 to 6 kHz) towards the frequency axis). This phase offset is the reason of the nonlinear disturbances in the backscattering curves.

Figure 5B:
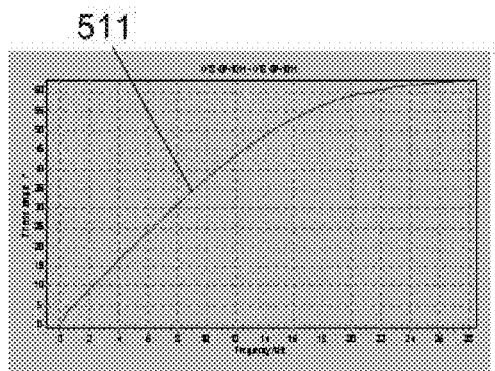

FIG. 4b shows an example of data without phase error in the complex frequency measurement data corresponding to the data of FIG. 4a with a phase error. The top figure represented by reference numeral 44 similarly shows the magnitude of both complex measurement signals 441, 442 (representing Anti-Stokes and Stokes, respectively as function of measurement point) as a function of the frequency. The middle FIG. 45 similarly shows the backscattering curves 451, 452 after the Fourier Transformation (representing Anti-Stokes and Stokes, respectively). It is observed that the behaviour of the curve around 1450 m (reference numeral 453) near the fibre end is significantly different from the corresponding curve of FIG. 4a. The phase error compensated data provides a linear behaviour as also shown on the bottom temperature [° C.] curve versus location [m] 46. An elevated temperature is indicated by the peak 461 around 2000 m. FIG. 5b shows a detailed view of the corresponding phase function 512 of the complex measurement signal as function of frequency. It is seen that the phase angle curve includes the point (0,0).

Figure 5C:
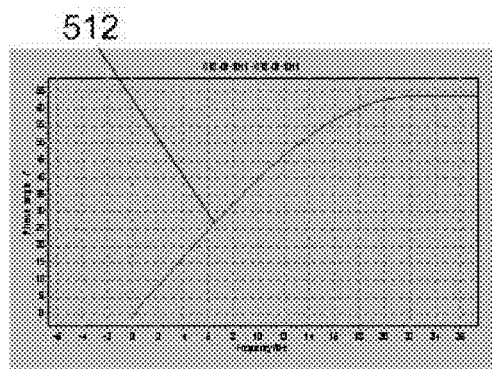

FIG. 5 shows the phase function of the received (converted electrical) signal of a Raman backscattering temperature measurement system, FIG. 5a showing a frequency range from 0 to 260 kHz and FIGS. 5b and 5c details of the curve in a frequency range from 0 to 30 kHz with and without offset error, respectively.

The absolute phase value of the offset error is very low (typically <1°). The off-set value is determined by a linear approximation of the phase function in the low frequency region (linear extrapolation of the curve to its intersection with the frequency axis, frequency→0 Hz and beyond). The next step is additive valuation of the complete phase function with the (possibly) negative offset value. The determination of the phase offset error and its correction may preferably be a part of an online measuring procedure of a DSP (Digital Signal Processing) software tool, as mentioned above in the description of the automated system calibration procedure.

The result of the phase angle offset correction is shown in FIGS. 4b and 4c.

5. Automated System Calibration Procedure

It is advantageous that the sensor be incorporated in the calibration procedures. The backscattering properties of the optical waveguide influence the course of the complex received frequency data, so that the values of errors from the apparatus (the excitation and evaluation part) are not constant. Further, their impact on the temperature profile is different. The calibration of the excitation and evaluation part should be repeated when the properties of the sensor changes (e.g. due to a substitution of the sensor or to the change of physical properties of the sensor connected to the excitation and evaluation part). In other words, a re-calibration of the measurement system should be performed (at least) in case the sensor is replaced by another sensor with different physical properties (incl. length, chemical composition, attenuation, etc.).

The present calibration procedure comprises an automatable, e.g. computer controlled, method of removing the residual error in the phase of the complex received frequency data and the DC-error in the backscattering data based on the concept of noise linearity.

Based on the expected values of the noise signal after the end of the optical fibre (mean value equal 0 and gradient/slope equal 0) in the linear data representation of backscattering curves, the correction factors for the DC value correction procedure (correcting the magnitude of the first frequency point) and for the phase-offset-correction procedure (eliminating the phase-offset in the whole phase characteristic of frequency data) are e.g. determined as described in the following way.

In the $1^{st}$ step a larger number of measurements (e.g. 20) are performed using the online procedures "DC value correction" and "phase-offset-correction" without eliminating the discovered residual errors. The data is memorized in an "uncorrected frequency data array".

In the $2^{nd}$ step "residual error correction factors" for the online-procedures named above, which are initialized to neutral values at the first iteration step, are applied to the "uncorrected frequency data array" resulting in the "corrected frequency data array".

In a $3^{rd}$ step the IFFT is applied to each frequency data set resulting in the "corrected array of backscattering curves" which are averaged to reduce the magnitude of noise especially in the area beyond the end of fibre. The magnitude of noise should be lower than 20 samples, for example.

In a $4^{th}$ step the characteristic of noise in the area beyond the end of fibre is analyzed. There are two independent criteria to modify the "residual error correction factors".

1. If the mean value of noise beyond the end of the fibre in the linear representation of averaged backscattering data is positive, the residual error correction factor for the DC value correction procedure has to be decreased, if negative, increased.
2. If the gradient (slope) of noise beyond the end of fibre in the linear data representation of averaged backscattering data is positive, the residual error correction factor for the phase-offset-correction procedure has to be decreased, if negative, increased.

The steps 2 to 4 are repeated for the Stokes and Anti-Stokes signal until the values of acceptable deviations from 0 for the mean value and gradient of noise beyond the end of fibre (e.g. convergence criteria of the iteration method: mean value <0.05 samples; gradient <0.005 samples) are fulfilled. In a final step the residual error correction factors are memorized to the dedicated system (including a fibre). The online procedures "DC value correction" and "phase-offset-correction" have to use these system specific factors in further operation.

The described iteration method "automated system calibration" is suitable for automation, production of measurement systems in larger quantities, and for being used in field measurements for commissioning and maintenance also eliminating aging effects. It eliminates the impacts of DC errors (see FIGS. 11a, 12b and 12c) and phase-offset-errors (see FIGS. 12d and 12e) on the linearity of backscattering curves.

FIG. 11a shows the backscattering curve of the Raman light of a sensor with a length of 5273 m without DC error. Raman light which resides at the end of the fibre escapes and cannot be detected with the measurement device. The signal after the fibre end has random noise behaviour corresponding to noise properties of the photo detector. Random noise behaviour provides a signal which has a magnitude fluctuating around zero with a mean value of zero at all fibre positions beyond the fibre end, which includes that the gradient (slope) is also zero. FIG. 11b shows the same backscattering curve as before only in a linear scale. The graph confirms the random noise behaviour beyond the fibre end. The random noise is linear function of distance.

For the case that the calculation of the DC value or the phase-offset value has a small error, the random noise has not the same feature as before. The noise contains an in general different offsets which produces a nonlinear function along the distance. FIGS. 11b and 11c show these noise properties on the backscattering curves with the same conditions as before inclusive DC error.

Figure 11D:
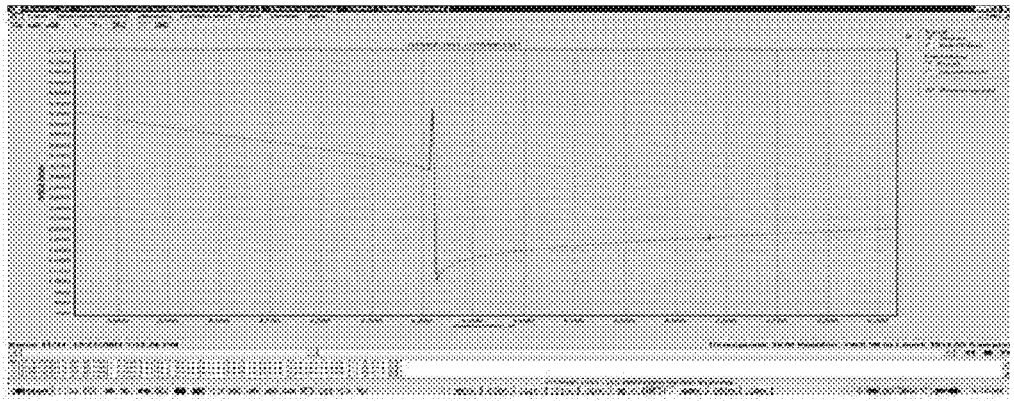
Figure 11E:
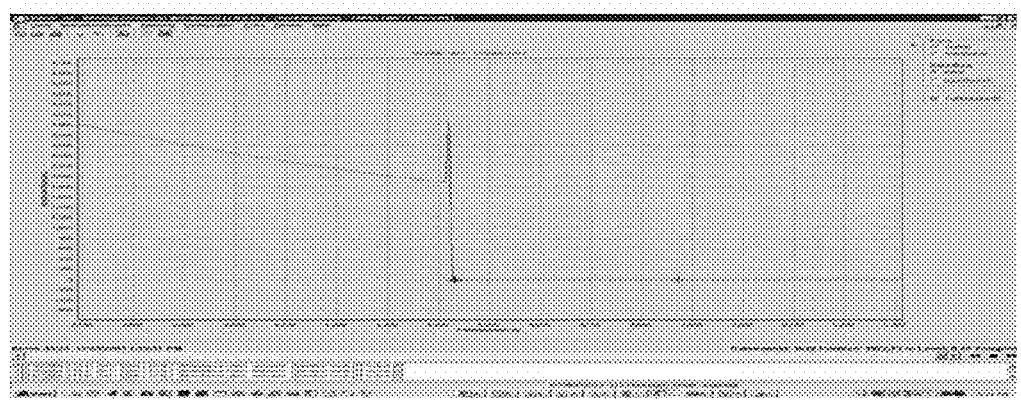

FIG. 11d shows the noise properties of the backscattering curve of an optical fibre of length 4415 m with phase-offset error (the vertical 'Y-axis' being on a linear scale), and FIG. 11e shows the corrected backscattering curve of the optical fibre of FIG. 11d without phase offset error (linear scale of the Y-axis).

6. Frequency Calibration

6.1 Introduction

Nonlinear behaviour of optic and electronic components produces contortion in the frequency data. The result is also a nonlinear contortion along the temperature profile which reduces the accuracy of the temperature measurement system. These kinds of errors have a slight nonlinear offset of maximal ±1 K along the temperature profile. Especially for sensor applications with a need for high temperature accuracy an additional calibration procedure is necessary.

The above mentioned nonlinear effects result in a nonlinear valuation of every measurement point of the complex frequency function. In contrast to the additive errors due to cross talk, the nonlinear effects result in a multiplicative error in every complex frequency point. This kind of multiplicative error function can be corrected by a so-called frequency calibration. The frequency calibration is advantageously the final correction sequence of the whole calibration of the optical FMCW backscattering measurement system.

Figure 12A:
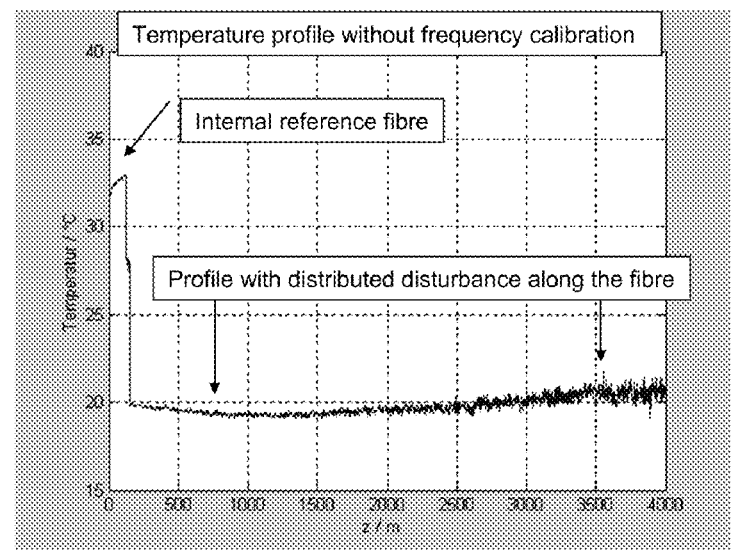
FIG. 12a shows the temperature profile as a function of the fibre length without frequency calibration.

FIG. 12a shows a temperature profile, i.e. temperature [° C.] as function of the fibre length coordinate z [m], without frequency calibration showing a distributed disturbance along the fibre. The sensor consists of two different optical fibres (here) serially connected. The first optical fibre with a length of around 100 m (denoted 'Internal reference fibre' in FIG. 12a) is located in the measurement system as a temperature reference for the temperature calculation. The second fibre with a length of around 3900 m is the actual sensor fibre, which is connected per optical plug at the measurement system. The sensor fibre is located in a climatic chamber at a temperature of 20° C.

The temperature profile along the sensor cable reveals the above mentioned nonlinear contortion along the temperature profile. Instead of a constant temperature profile with a temperature value of 20° C., the nonlinear behaviour of optic and electronic components produces a nonlinear disturbance along the temperature profile. The maximal error of −1 K corresponds to the length position around z=1000 m and the maximal error of +1 K corresponds to the length position around z=3500 m (see FIG. 13a).

Figure 12B:
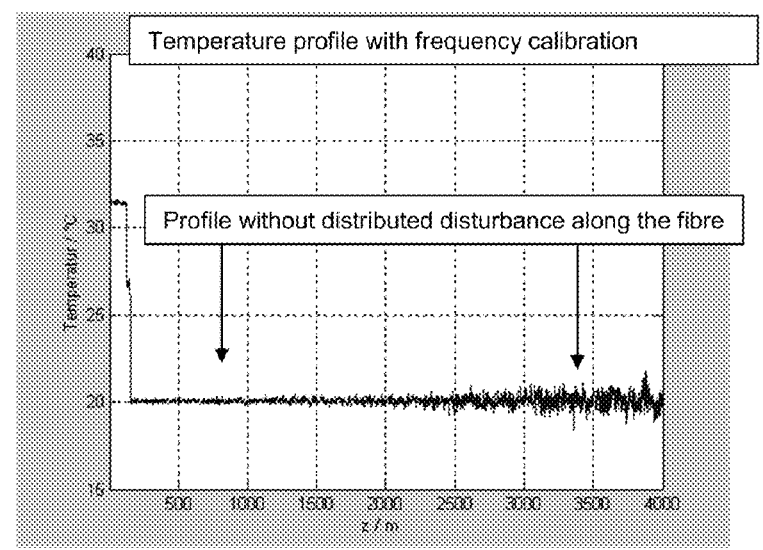
FIG. 12b shows the temperature profile as a function of the fibre length with frequency calibration.

FIG. 12b shows a temperature profile as function of the fibre length of the same above mentioned fibre after the frequency calibration. The graph shows the temperature profile of the sensor cable with the expected temperature value of 20° C. The impact of the nonlinear contortion along the whole temperature profile (inclusive the internal reference fibre) is corrected. The frequency calibration method takes into account the theoretical convolution between the frequency and spatial domain, cf. the outline above based on Fourier analysis.

From this mathematical framework, the complex frequency data may be calculated. Important is the knowledge of the relevant sensor properties, e.g. of a special standard optical fibre, which may e.g. be extracted from measurements of the fibre with an already calibrated measurement equipment.

6.2 Mathematical Framework

The following equation describes the Raman backscattering curve as function of the location and is the mathematical basis for determining the complex frequency function by using Fourier Transformation.

$$s_R(z) = \int_{-\infty}^{+\infty} S_R(v) \cdot e^{j2\pi \cdot v \cdot z} dv = \rho_R(z) \cdot e^{-2 \cdot a_{PR} \cdot z}$$

The above equation for the Raman backscattering curve describes the case of one optical fibre. With the condition of constant Raman backscattering factor $\rho_R$ and constant attenuation coefficient $\alpha_{PR}$ along the optical fibre the complex frequency function of the Raman light is represented by:

$$S_{R1}(v) = \frac{\rho_{R_1}}{2 a_{PR_1} + j 2 \pi v} \left(1 - e^{-2 \cdot a_{PR_1} \cdot L_1} \cdot e^{-j 2 \pi \cdot v \cdot L_1}\right)$$

$L_1$ is the length of the optical fibre. Additional effects due to Fresnel refection, described by the reflection factor $R_{FR}$, and additional losses due to insertion losses $\eta$ are not included in the above mentioned equation.

In an attempt to find a suitable mathematical description of the practically relevant optical fibre setup, we must expand the optical model of properties. With reference to the calibration method, we must contemplate a fibre setup with two different optical fibres with different lengths ($L_1$, $L_2$), different Raman backscattering factors ($\rho_{R1}$, $\rho_{R2}$) and different attenuation coefficients ($\alpha_{PR1}$, $\alpha_{PR2}$). The insertion losses of the optical plug for the optical fibre connection is describe by $\eta_{1-2}$. The corresponding complex frequency function of the backscattering Raman light of two optical fibres is $$S_R(v) = S_{R1}(v) + S_{R2}(v)$$

with $$S_{R1}(v) = \frac{\rho_{R1}}{2a_{PR_1} + j2\pi v}\left(1 - e^{-2a_{PR_1} \cdot L_1} \cdot e^{-j2\pi \cdot v \cdot L_1}\right)$$

$$S_{R2}(v) = \eta_{1-2} \cdot \left\{\frac{\rho_{R2}}{2a_{PR_2} + j2\pi v}\left(\frac{1 - e^{-2a_{PR_2} \cdot L_2} \cdot}{e^{-j2\pi \cdot v L_2}}\right)\right\} \cdot e^{-j2\pi \cdot v \cdot L_1}$$

The following mathematical model consider the Fresnel reflection factors at the first optical fibre end ($R_{FR1}$), at the optical plug connection ($R_{FR2}$) and also at the second end of the optical fibre setup ($R_{FR3}$). The refection properties can be described by the following complex frequency term:

$$S_{FR}(v) = S_{F1}(v) + S_{F2}(v) + S_{F3}(v)$$

with $$S_{F1}(v) = R_{FR1}$$

$$S_{F2}(v) = R_{FR2} \cdot e^{-2 \cdot \alpha_{PR1} \cdot L_1} \cdot e^{-j2\pi \cdot v \cdot L_1}$$

$$S_{F3}(v) = R_{FR3} \cdot \eta_{1-2} \cdot e^{-2 \cdot \alpha_{PR1} \cdot L_1} \cdot e^{-j2\pi \cdot v \cdot L_1} \cdot e^{-2 \cdot \alpha_{PR2} \cdot (L_2 - L_1)} \cdot e^{-j2\pi \cdot v \cdot (L_2 - L_1)}$$

The complete expression for the complex frequency signal based on the above mentioned optical fibre setup is the sum of the backscattering and reflected Raman light:

$$S_R(v) = S_{R1}(v) + S_{R2}(v) + S_{F1}(v) + S_{F2}(v) + S_{F3}(v)$$

The development of these terms are based on the group velocity model of optical cables (cf. e.g. G. Grau, W. Freude, "Optische Nachrichtentechnik", Springer Verlag", and H.-G. Unger, "Optische Nachrichtentechnik", Teil 1 and Teil 2, Hüthig-Verlag).

6.3 Calibration Procedure

The optical parameters (fibre length, Raman backscattering factor, attenuation coefficient, insertion losses and Fresnel reflections) of the optical fibre setup (calibration fibre) can be measured by commercial optical devices using Optical Time Domain Refectory (OTDR) (cf. e.g. Erhard Grimm, Walter Nowak, "Lichtwellenleitertechnik", Hüthig-Verlag). The impact of Fresnel reflections can be reduced by using an optical plug with low return loss and cutting the optical fibre end by an angle cliff.

With this knowledge about the optical properties of the optical setup, the expected complex frequency curve can be determined with the above mentioned mathematical model. The complex ratio of the measured data of the FMCW backscattering system $S_{RM}$ to the calculated complex frequency function $S_R$ provides the complex frequency error function:

$$S_K(v) = \frac{S_{RM}(v)}{S_R(v)}$$

Figure 13A:
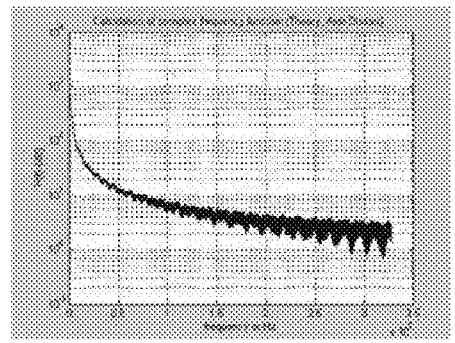
FIG. 13a shows the complex calculated magnitude function of the Anti-Stokes signal as a function of frequency.
Figure 13B:
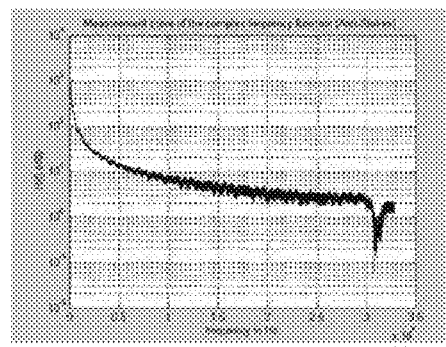
FIG. 13b shows the complex measured magnitude function of the Anti-Stokes signal as a function of frequency.
Figure 13C:
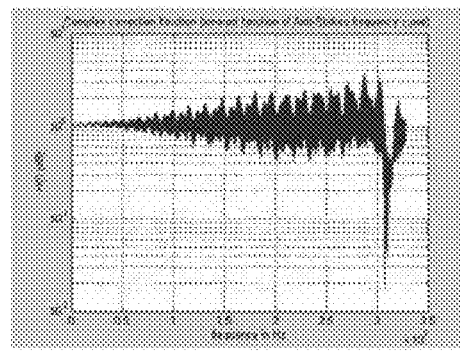
FIG. 13c shows the complex frequency error function of the Anti-Stokes signals as a function of frequency.

FIG. 13a shows the calculated complex magnitude function of the Anti-Stokes receiver signal as function of frequency (from 0 to 35 MHz). The corresponding measured signal of the Anti-Stokes signal is posed into FIG. 13b. The complex ratio of the measured to the calculated signal is the complex frequency error function. FIG. 13c shows the corresponding complex error function $S_K$ of the Anti-Stokes signal. The vertical axis (Y-axis) is in a logarithmic scale [dB]

The resulting deviations between the measured and calculated frequency data may be corrected by a signal processing unit, e.g. a DSP. The complex frequency error function must be stored in a memory, e.g. a memory of a DSP. At the start of the (next) measurement, the detected frequency data $S_{RM}$ of the Raman signals can corrected with the complex frequency error function $S_K$ by the following complex division:

$$S_{ideal}(v) = \frac{S_{RM}(v)}{S_K(v)}$$

The result of the frequency calibration is a temperature profile without nonlinear contortion and high accuracy.

An advantage of the complex frequency correction is the prevention of nonlinear disturbances in the backscattering curves. For applications which need backscattering profiles with a high accuracy, the correction by the complex frequency error function can be advantageous. The storage of the two complex frequency error functions $S_K$ (Stokes and Anti-Stokes) requires a sufficient memory, e.g. on the DSP board.

An alternative to determining the complex frequency error function in the frequency domain is the calculation of a relationship error function of the backscattering curves from Anti-Stokes to Stokes signals in the spatial domain.

Figure 14A:
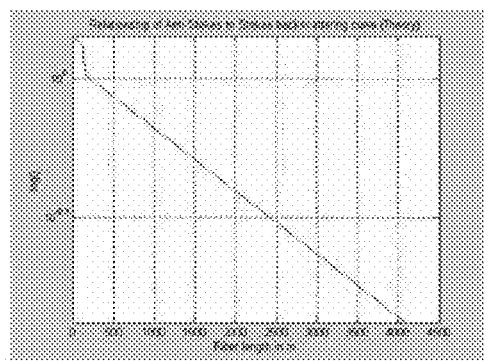
FIG. 14a shows the calculated relationship of an Anti-Stokes to Stokes backscattering curve.
Figure 14B:
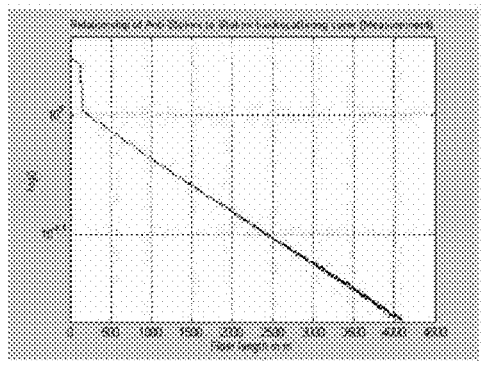
FIG. 14b shows the calculated relationship of Anti-Stokes to Stokes backscattering curve.

FIG. 14a shows the relationship (i.e. the ratio or numerical quotient on a point by point basis), $s_{Anti-Stokes}(z)/s_{Stokes}(Z)$ of the Anti-Stokes to the Stokes backscattering curve of the calculated (theoretical) signals and FIG. 14b shows the corresponding measured relationship of the Anti-Stokes to Stokes backscattering curve in logarithmic vertical scale as a function of the fibre length coordinate [m].

Figure 14C:
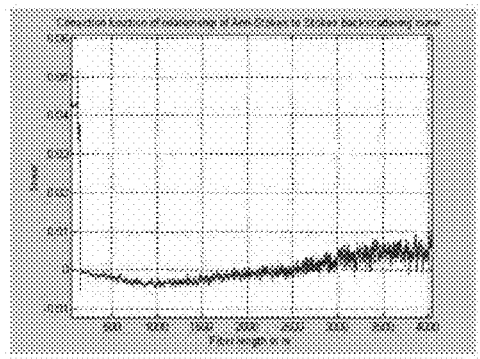
FIG. 14c shows the relationship error function of Anti-Stokes to Stokes backscattering curve.

The difference between the relationships of the Anti-Stokes to Stokes backscattering curves from the measured and calculated complex frequency signal function is shown in FIG. 14c. The vertical scale in FIG. 14c is linear and the axial scale is the fibre length coordinate [m]. The resulting disturbances curve represents the temperature error function along the optical fibre (see FIG. 12a). The use of the relationship error function has the advantage that the requirements regarding data storage is much lower than those of the complex frequency error functions. A disadvantage is the nonlinear contortion in the Raman backscattering curves.

7. The Optical Sensor

Properties of the optical sensor, e.g. an optical fibre, including optical connectors, possible splices, coating, attenuation and length of the fibre, etc. has an influence on the measurements results. The properties have a direct influence on the complex received frequency data (e.g. originating from Raman scattering). Ideally, these effects are correctable and should not pose problems when changing the sensor (assuming that the new sensor properties are well characterized and accounted for). In reality, because of the finite accuracy of the corrections, a residual error is present in a normal calibration procedure (where the equipment is calibrated with a 'standard' sensor with known properties) leading to an error in the derived physical properties (e.g. temperature profile). Ideally, a re-calibration should be performed every time another sensor is connected to the excitation and evaluation unit. This is time consuming and impractical (especially for already installed equipment)

These problems may be overcome by an automated calibration based on the concept of noise linearity as outlined above (cf. section 5).

FIG. 6 shows measurements of the Raman Anti-Stokes light of a waveguide sensor with a length of 100 m, FIG. 6a showing the backscattering curve (logarithmic scale) and FIG. 6b showing the corresponding Fourier transformed frequency signal (magnitude function of the complex measurement signal).

FIG. 6a shows the backscattering curve of the Raman Anti-Stokes light of a waveguide sensor with a length of 100 m (logarithmic scale). The first part of the graph describes the linear attenuation of the Raman light along the fibre length. Light which escape the remote end of the fibre cannot reach the photo detector of the measurement device. The corresponding detector signal contains random noise which in the backscattering signal produces a noise band in the region beyond the remote end of the fibre. The characteristics of the corresponding Fourier transformed frequency signal is shown in FIG. 6b (magnitude function of the complex measurement signal). It is seen that the complex measurement signal and also the first measurement point (DC-value) depend on the length of the fibre. This implies that it is advantageous to repeat the hardware calibration routine when the optical properties of the sensor (optical fibre) are changed.

FIG. 7 shows measurements of the Raman Anti-Stokes light of a sensor with a waveguide length of 5000 m, FIG. 7a showing the backscattering curve (in a logarithmic scale) as a function of location in the fibre and FIG. 7b the magnitude function as a function of frequency.

A comparison of the corresponding frequency graphs of FIGS. 6b and 7b makes clear the impact of different sensor properties (here using fibre length as an example). This kind of changes of the frequency signal has also an impact on the measurement of the DC value. This means that the DC value is not a constant function and illustrates the advantage of including the sensor in the correction of the DC-value of the complex frequency data.

8. Cross Talk Calibration

Figure 10A:
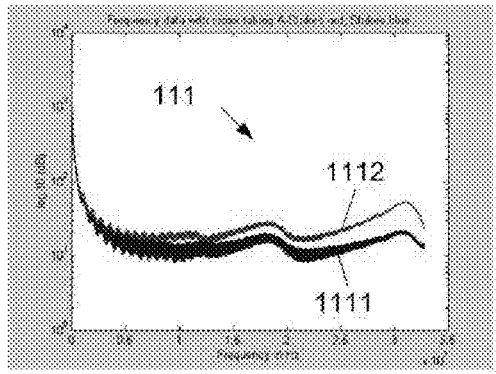
FIG. 10 illustrates the influence of cross talk between measurement channels on the resulting backscattering curves (all curves in a logarithmic scale on the vertical 'Y-axis'), FIG. 10a showing the measurement signal inclusive cross talk in the different channels (Anti-Stokes and Stokes), FIG. 10b showing an example of only the cross talk of different measurement channels.
FIG. 10c showing the measurement signal as function of frequency without electrical cross talk, FIG. 10d showing the backscattering curve of an optical fibre with cross talk error, and FIG. 10e the backscattering curve of an optical fibre without cross talk error.
Figure 10B:
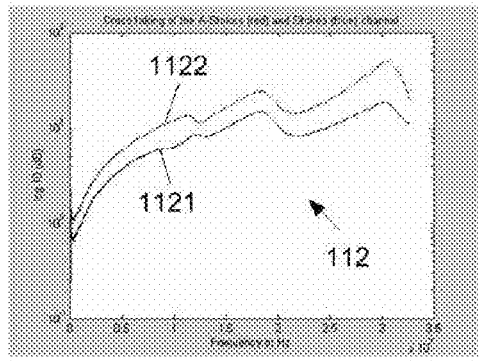

FIG. 10 illustrates the influence of cross talk between measurement channels on the resulting backscattering curves (all curves in a logarithmic scale on the vertical 'Y-axis'), FIG. 10a showing cross talk in the different channels (Anti-Stokes and Stokes), FIG. 10b showing the "pure" cross talk from the laser module to the optical receiver board of different measurement channels. In this case no optical signal can achieve the photo detector of the receiver boards. FIG. 10c showing the measurement signal as function of frequency without electrical cross talk, FIGS. 10d and 11e showing the backscattering curve of an optical fibre with and without cross talk error, respectively;

FIG. 10a shows both measurement signals of the Stokes and Anti-Stokes light as a function of the frequency (magnitude function). The expected signals must have an exponential drop along the frequency axis (a similar form as in FIG. 7b). The peaks at 18 MHz and at 30 MHz come from cross talk which produces additive overlays on the measurement signals. This kind of cross talk causes an additional error in the form of random noise and nonlinear interferences in the temperature profile. At the beginning of the backscattering curve (FIG. 11d) we can see a oscillation. This oscillation is eliminated after the cross talk compensation. In FIG. 11e the backscattering curve is flat at the beginning. A comparison of these to graphs (FIG. 11d and FIG. 11e) shows an additional effect at the position 140 m. The small drop corresponds to the insertion loss of the optical fibre connection. This impact into the backscattering is overlay due to the cross talk effect. This mean, that the cross talk produces errors and nonlinear effects in the backscattering curves with the consequence also into the temperature profile.

This kind of error is independent of the Raman measurement signal. We can measure these electrical disturbances very easily by opening the optical fibre plug connection at the laser module. The laser light is therefore no longer received by the photo detector. The frequency measurement in FIG. 10d shows the above mentioned error signal due to cross talk between the different channels.

FIG. 10b shows the complex cross talk between the Anti-Stokes und Stokes signals as function of the frequency in a logarithmic scale.

Figure 10C:
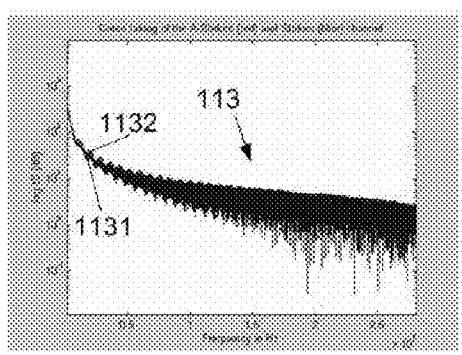

This complex cross talk signal can be stored in the DSP system. The error correction is an easy complex subtraction of the measuring signal (FIG. 10a) from the pure cross talking signal (FIG. 10b). The result of this operation represented FIG. 10c showing the measurement signal as function of frequency without electrical cross talk (logarithmic scale).

Figure 10D:
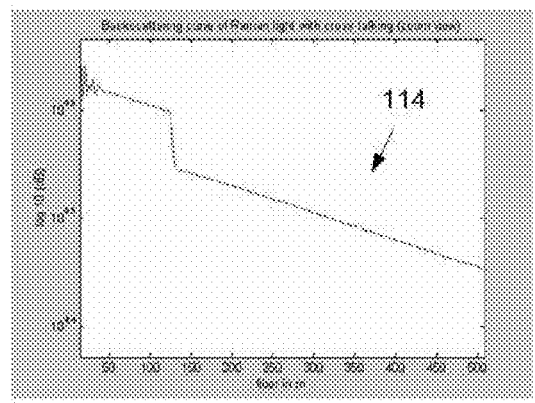
Figure 10E:
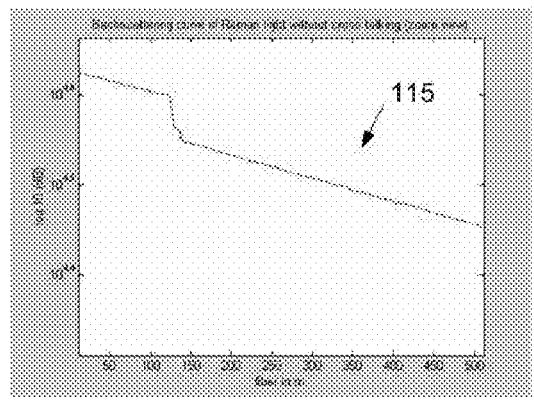

FIGS. 10d and 10e (all in a logarithmic scale) represent the corresponding backscattering curves with (FIG. 10d) and without (FIG. 10e) cross talk, respectively.

FIG. 11 shows backscattering curves for an optical waveguide sensor of a fixed length with and without DC-errors, the phase offset error having already been eliminated, FIG. 11a and 11b showing the backscattering curve of an optical fibre with a length of 5273 m without DC error, the vertical 'Y-axis' being on a logarithmic scale and a linear scale, respectively, and FIG. 11c showing the backscattering curve of an optical fibre with a length of 5273 m with DC error (logarithmic scale).

9. Calibration Sequence

9.1 Hardware Calibration

The basic idea by the development of a suitable hardware calibration procedure is to separate the errors to be able to perform an error orientated correction.

The different errors in the complex frequency curves can advantageously be arranged in the following correction sequence:
1. Additive frequency errors due to electrical cross talk
2. Phase offset error due to tolerances of components
3. DC errors due to the problem of measuring the DC value for the Inverse Fourier Transformation formula with a high precision
4. Residual errors of correction steps 2. and 3. due to physically limited precision
5. Multiplicative frequency errors due to nonlinear behaviour of components There are in principle other correction sequences possible, but the above mentioned sequence is preferred from a technical aspect.

9.2 Temperature Calibration

After the hardware calibration the next procedure is advantageously the temperature calibration based on the optical fibre properties with the following sequence:

1. Determination of the temperature dependence of the fibre coating)

2. Determination of the absolute temperature value

3. Determination of the sensitivity

Example 1

Figure 9:
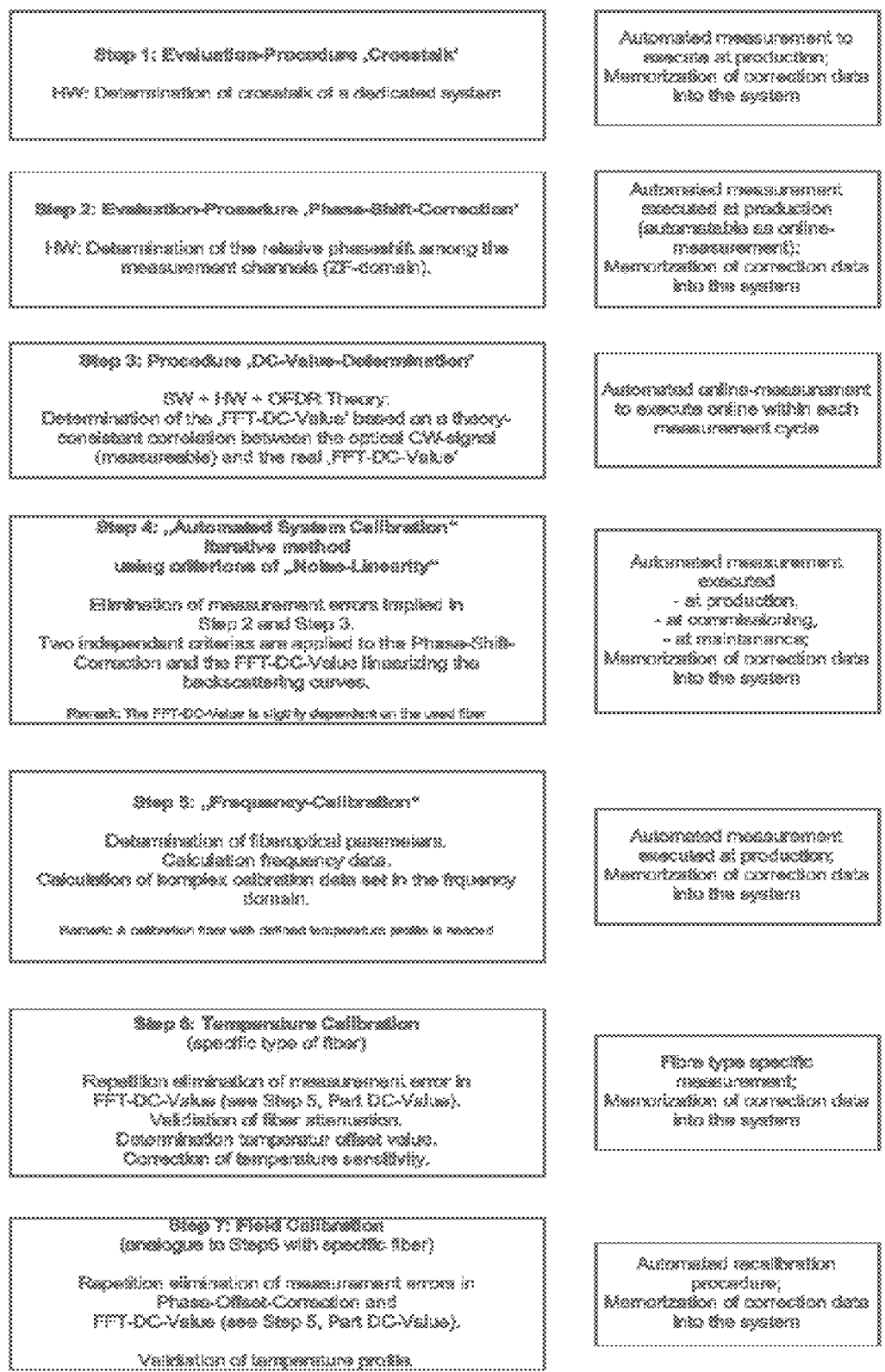
FIG. 9 shows an exemplary calibration procedure comprising steps of the procedure according to an embodiment of the present invention.

FIG. 9 shows an example of a preferred combination of calibration procedures.

In an embodiment, the method of calibration comprises the following steps which are part of an automated calibration procedure made in software in a DSP of the measurement system:

Step 1: Crosstalk Compensation

To eliminate crosstalk the crosstalk is determined with a specific measurement procedure (cf. section 8) during system manufacture. The results of measurement are memorized into the dedicated system. Within each measurement cycle in normal operation the memorized crosstalk is subtracted from the measured complex frequency data.

Step 2: Phase-Offset-Correction

The phase-offset can be determined by linear approximation (cf. section 4) during system manufacture or as online measurement within each measurement cycle in normal operation. The slightly error-prone result of the approximation is improved by a second correction factor determined with the automated system calibration applying criteria on noise, if step 4 was already executed.

Step 3: DC-Value-Correction

The DC-value-correction as specific method to determine the true FFT-DC-value (cf. section 3) is executed automatically (online) within each measurement cycle in normal operation. The DC-correction procedure takes the results of the automated system calibration applying criteria on noise into consideration, if step 4 was already executed.

Step 4: Automated System Calibration

The residual errors of the phase-offset-correction and the DC-value-correction are determined by the automated system calibration (cf. section 5). With the described iteration method using defined rules to modify correction factors until convergence criteria are fulfilled a linearization of backscattering curves is achieved. The automated system calibration is performed during production and has to be repeated during commissioning and maintenance to take a different fibre or aging effects into consideration. The results of the automated system calibration are also memorized into the system and are applied in step 2 and 3 within each measurement cycle in normal operation.

Step 5: Frequency Calibration

The frequency calibration (cf. section 6) takes into account that beneath the phase-offset and the DC value there are a phase characteristic and a magnitude characteristic for measurement frequencies above zero Hz deviating from ideal results. The correction data is determined within a specific measurement during production of a dedicated system and memorized into the system. Within each measurement cycle in normal operation this data is applied on the frequency data after the DC-value-correction and phase-offset-correction.

Step 6: Temperature Calibration

The correction data (cf. section 9.2) are determined within a specific measurement during manufacture of a dedicated system and memorized in the system.

Step 7: Field Calibration

The field calibration is a repetition of step 4 only by a software procedure, without any other resources. The evaluation unit needn't be opened for this purpose. The results of the recalibration eliminate a feedback effect mainly on the DC value when the system is modified by a change of fibre and aging effects of the evaluation unit.

Example 2

With reference to the problems of the prior art mentioned in the section 'Background art' above (points a)-e)), the following example discusses solutions to those problems in the framework of the present invention.

a) DC-Errors:

a1) Difficulty of determining the value of the backscattering signal at $f_m=0$ (DC value).

a2) The DC value dependent on sensor properties.

a1) and a2) are compensated by the automated DC-correction procedure (cf. section 3 above), which is a measurement procedure, additionally using a correction factor determined by a linearization procedure called automatic system calibration (cf. section 5 above) applying criteria related to noise characteristics in the backscattering curves. To determinate the DC value exactly, the DC-correction procedure uses the results of the linearization procedure to eliminate residual error.

b) Errors Due to Tolerances and Nonlinear Behaviour of Optic and Electronic Components.

b) is compensated by the phase offset correction procedure (tolerances of the components), cf. sections 4 and 5 above, and also by the frequency calibration procedure (nonlinear behaviour of components), cf. section 6 above.

The phase off-set value is determined through approximation of the phase curve around $f_m=0$. The phase deviation is used as input to a correction algorithm including the subtraction of the offset value from the whole phase curve of the complex frequency data signal.

b) is compensated in two steps:

1. At first, a relative phase shift between the measurement channels as constant phase error of the phase characteristic of frequency data is determined. This phase shift has the largest impact on the quality of measurement results. It is compensated by the 'phase-offset-correction procedure' applied to the whole phase characteristic. The procedure is based on the approximation of the measured phase angle for $f_m=0$ Hz. The approximation is slightly error-prone (cf. section 4 above). The remaining residual error is eliminated by using the results of the linearization procedure called "automated system calibration" (cf. section 5 above).

2. In a $2^{nd}$ step, nonlinearities of the phase and magnitude characteristic for measurement frequencies >0 Hz are eliminated by use of the 'frequency calibration procedure' (cf. section 6 above).

c) Errors Due to Cross Talk Between Different Measurement Channels.

c) is compensated by the cross talk compensation procedure (cf. section 8 above).

d) Errors Due to Ageing Effects of Electronic Components.
d) is compensated by repeating the hardware calibration (cf. section 9.1 above) every now and then when a change is suspected.

e) Errors Caused by a Change of the Sensor Line.
e) is compensated by the automatic system calibration (cf. section 5 above), which linearizes the backscattering curves applying criteria related to noise characteristics.

Some preferred embodiments have been shown in the foregoing, but it should be stressed that the invention is not limited to these, but may be embodied in other ways (including ways that are not based on optical backscattering techniques) within the subject-matter defined in the following claims.

The invention claimed is:

1. A method of calibrating an optical FMCW backscattering measurement system, the system comprising an excitation and evaluation part and a longitudinally extending sensor, the sensor having a first and a second end, the excitation and evaluation part being adapted for exciting a frequency modulated light signal with modulation frequency fm and for evaluating a sensor signal received from the first end of the sensor, the sensor being adapted for capturing a data signal based on the frequency modulated light signal from which physical parameters of spatially distributed measurement points of the sensor along its length between the first and second ends may be extracted, the method comprising the steps of
   A. converting said received sensor signal to a complex received electrical signal as a function of said modulation frequency fm, said complex received electrical signal being represented by a magnitude part and a phase angle part as a function of said modulation frequency $f_m$;
   B. performing a transformation of said received electrical signal to provide a backscattering signal as a function of location between said first and second ends of said sensor and beyond said second end;
   C. indicating said backscattering signal as a function of location determining characteristics of a curve representative of said backscattering signal beyond said second end;
   D. correcting said magnitude part of said received electrical signal and said phase angle part of said received electrical signal in a predetermined dependence of said curve;
   E. repeating step B on the basis of the corrected received electrical signal.

2. The method according to claim 1 further comprising a step F of optionally repeating C, D, and E until a predetermined criterion is fulfilled.

3. The method according to claim 2 wherein said predetermined criterion is that said curve representing said backscattering signal beyond said second end of said sensor can be approximated by a straight line with a slope of approximately 0.

4. The method according to claim 3 wherein said slope is less than 0.5 samples.

5. The method according to claim 2 wherein said predetermined criterion comprise the criterion that the mean value of the samples for a part of or all of said backscattering signal beyond said second end is less than 0.5 samples.

6. The method according to claim 1 wherein said correction of said magnitude part of said received electrical signal comprises correcting the magnitude data by an initial correction amount $\Delta H_0(0)$ at the modulation frequency $f_m$ equal to 0.

7. The method according to claim 6 wherein said initial correction amount $AH_0(0)$ is set to a predetermined value.

8. The method according to claim 6 wherein said initial correction amount $AH_0(0)$ is determined by the amount of deviation of the mean value of noise in the backscattering curve from 0.

9. The method according to claim 6, wherein said correction of said phase angle part of said received electrical signal comprises determining an initial off-set value $\Delta\phi_o(0)$ of the phase angle of the received electrical signal as a function of said modulation frequency $f_m$ around $f_m=0$; and by subsequently correcting data representing said phase angle of the received electrical signal as a function of modulation frequency $f_m$ with said off-set value.

10. The method according to claim 9 wherein said initial off-set value $\Delta\phi_o(0)$ is set to a predetermined value.

11. The method according to claim 9, wherein said initial offset value $\Delta\phi_o(0)$ is determined by linear extrapolation of the phase angle data for $f_m \to 0$ Hz.

12. The method according to claim 1 wherein A, B, C, D, and E of said calibration procedure are performed in each measurement cycle.

13. The method according to claim 9 wherein D further comprises determining a residual correction factor $\Delta H_{res}(0)$ and determining a residual off-set value $\Delta\phi_{res}(0)$, both being based on backscattering data calculated from data representing said magnitude part and said phase angle part, respectively, as a function of said modulation frequency $f_m$ after correction by said initial correction amount $AH_0(0)$ and said initial off-set value $\Delta\phi_o(0)$ respectively, wherein the value of said residual correction factor $\Delta H_{res}(0)$ is based on the mean value of the average level of said backscattering signal beyond said second end of said sensor, and the value of said residual off-set value $\Delta\phi_{res}(0)$, is based on the value of the slope of said backscattering signal beyond said second end of said sensor.

14. The method according to claim 13 wherein said determinations of correction factor $\Delta H_{res}(0)$ and off set value $\Delta\phi_{res}(0)$, are based on averaged backscattering curves.

15. The method according to claim 1 wherein said calibration is performed using a standardized optical sensor with well-known characteristics.

16. The method according to claim 13 wherein said calibration is performed if characteristics of the sensor changes or if other characteristics of the system have or are suspected to have changed.

17. The method according to claim 1 wherein said measurement system is a Raman backscattering system adapted for measuring a spatially distributed temperature profile.

18. The method according to claim 1 wherein said calibration method is performed for signals representative of Anti-Stokes as well as for Stokes signals.

19. The method according to claim 1 additionally comprising a cross talk correction procedure comprising:
   G1) determining and storing cross talk between measurement channels of the measurement system with a specific measurement procedure during system manufacture, and
   G2) within each measurement cycle of normal operation subtract the memorized crosstalk data from the measured complex frequency data.

20. The method according to claim 19 wherein said cross talk correction procedure is carried out prior to other corrective calibration steps.

21. The method according to claim 1 wherein the sensor comprises a reference part serially connectable to a measurement part.

22. The method according claim 1 additionally comprising taking into account the theoretical convolution between the frequency and spatial domain, wherein in H1, the expected complex frequency curve is determined from a mathematical model, and a complex frequency error function constituted by the complex ratio of the measured data of the FMCW backscattering system $S_{RM}$ to the calculated complex frequency function $S_R$ is determined, and stored in a memory, and H2 at the start of a following measurement cycle, the measured frequency data $S_{RM}$ is corrected with the complex frequency error function.

23. The method according to claim 22 additionally comprising a cross talk correction procedure carried out after other corrective calibrations, said cross talk correction procedure comprising G1) determining and storing cross talk between measurement channels of the measurement system with a specific measurement procedure during system manufacture, and G2) within each measurement cycle of normal operation subtract the memorized crosstalk data from the measured complex frequency data.

24. An optical FMCW backscattering measurement system comprising a computer readable medium having stored thereon a computer readable program code for executing a calibration method according to claim 1.

25. A computer readable medium having stored thereon a computer readable program which when run on a computer can execute a calibration method according to claim 1.

26. The method according to claim 2 wherein said predetermined criterion comprise the criterion that the mean value of the samples for a part of or all of said backscattering signal beyond said second end is less than 0.05 samples.

27. The method according to claim 7, wherein the predetermined value is an estimated value.

28. The method according to claim 13, wherein said determinations of correction factor $\Delta H_{res}(0)$ and off set value $\Delta \phi_{res}(0)$ are based on averaged backscattering curves of more than 5 measurements.

29. The method according to claim 13, wherein said determinations of correction factor $\Delta H_{res}(0)$ and off set value $\Delta \phi_{res}(0)$ are based on averaged backscattering curves of more than 10 measurements.

30. The method according to claim 28, wherein said determinations of correction factor $\Delta H_{res}(0)$ and off set value $\Delta \phi_{res}(0)$ are based on averaged backscattering curves of more than 20 measurements.

31. The method according to claim 13, wherein said calibration is performed if optical characteristics of the sensor changes.

32. The method according to claim 1, wherein said correction of said phase angle part of said received electrical signal comprises determining an initial off-set value $\Delta \phi_o(0)$ of the phase angle of the received electrical signal as a function of said modulation frequency $f_m$ around $f_m=0$; and by subsequently correcting data representing said phase angle of the received electrical signal as a function of modulation frequency $f_m$ with said off-set value.

33. The method according to claim 3 wherein said slope is less than 0.05 samples.

34. The method according to claim 3 wherein said slope is less than 0.005 samples.

* * * * *